(12) United States Patent
Altan et al.

(10) Patent No.: US 11,691,358 B2
(45) Date of Patent: Jul. 4, 2023

(54) SYSTEM AND METHOD FOR PRESSURIZED INFUSION LIQUID COMPOSITE MOLDING

(71) Applicant: The Board of Regents of the University of Oklahoma, Norman, OK (US)

(72) Inventors: M Cengiz Altan, Norman, OK (US); Mehmet Akif Yalcinkaya, Istanbul (TR)

(73) Assignee: The Board of Regents of the University of Oklahoma, Norman, OK (US)

(*) Notice: Subject to any disclaimer, the term of this patent is extended or adjusted under 35 U.S.C. 154(b) by 0 days.

(21) Appl. No.: 16/920,547

(22) Filed: Jul. 3, 2020

(65) Prior Publication Data
US 2021/0001575 A1 Jan. 7, 2021

Related U.S. Application Data

(60) Provisional application No. 62/870,389, filed on Jul. 3, 2019.

(51) Int. Cl.
 *B29C 70/44* (2006.01)
 *B29C 70/48* (2006.01)

(52) U.S. Cl.
 CPC ............ *B29C 70/443* (2013.01); *B29C 70/48* (2013.01)

(58) Field of Classification Search
 None
 See application file for complete search history.

(56) References Cited

U.S. PATENT DOCUMENTS

| | | | | |
|---|---|---|---|---|
| 5,441,692 A | * | 8/1995 | Taricco | B29C 70/48 264/257 |
| 2008/0054523 A1 | * | 3/2008 | Hanson | B29C 70/549 264/314 |

(Continued)

OTHER PUBLICATIONS

Yalcinkaya, M. Akif et al., Pressurized Infusion: A New and Improved Liquid Composite Molding Process, Journal of Manufacturing Science and Engineering, Published Online Oct. 26, 2018, US.

(Continued)

*Primary Examiner* — Christopher T Schatz
(74) *Attorney, Agent, or Firm* — Crowe & Dunlevy, P.C.

(57) ABSTRACT

A liquid composite molding method includes the steps of providing a part mold that has an inlet gate and an exit gate, placing a fabric preform over the part mold, placing a membrane over the fabric preform and securing a pressure cap to the part mold. The pressure cap and part mold together form a pressure chamber with a headspace between the membrane and the pressure cap. The method further includes the step of filling the fabric preform with liquid resin under the membrane while applying pressure within the headspace over the membrane. The method may be practiced with an apparatus that has a pressure chamber, a fabric preform inside the pressure chamber, a membrane over the fabric preform, a resin injection assembly, and a resin extraction assembly. The pressure chamber includes a part mold and a pressure cap. A headspace is formed above the membrane within the pressure chamber.

10 Claims, 14 Drawing Sheets

(56) References Cited

U.S. PATENT DOCUMENTS

2012/0125534 A1* 5/2012 Watson ............... B29C 66/1122
156/285
2014/0191447 A1* 7/2014 Chiu ....................... B29C 70/48
264/571

OTHER PUBLICATIONS

Abraham, D., Matthews, S., and McIlhagger, R., 1998, "A Comparison of Physical Properties of Glass Fibre Epoxy Composites Produced by Wet Lay-up with Autoclave Consolidation and Resin Transfer Moulding," Compos. Part A Appl. Sci. Manuf., 29(7), pp. 795-801.

Allende, M., Mohan, R. V., and Walsh, S. M., 2004, "Experimental and Numerical Analysis of Flow Behavior in the FASTRAC Liquid Composite Manufacturing Process," Polym. Compos., 25(4), pp. 384-396.

Almeida, M. De, Cerqueira, M., and Leali, M., 2001, "The Influence of Porosity on the Interlaminar Shear Strength of Carbon / Epoxy and Carbon / Bismaleimide Fabric Laminates," Compos. Sci. Technol., 61, pp. 2101-2108.

Alms, J. B., Advani, S. G., and Glancey, J. L., 2011, "Liquid Composite Molding Control Methodologies Using Vacuum Induced Preform Relaxation," Compos. Part A Appl. Sci. Manuf., 42(1), pp. 57-65.

Alms, J. B., and Advani, S. G., 2007, "Simulation and Experimental Validation of Flow Flooding Chamber Method of Resin Delivery in Liquid Composite Molding," Compos. Part A Appl. Sci. Manuf., 38(10), pp. 2131-2141.

Alms, J. B., Glancey, J. L., and Advani, S. G., 2008, "An Experimental Approach to Port-Based Injection in Vacuum Infusion Processing," The 9th International Conference on Flow Processes in Composite Materials (Montreal, Canada, Jul. 8-10, 2008).

Amirkhosravi, M., Pishvar, M., and Altan, M. C., 2017, "Improving Laminate Quality in Wet Lay-up/Vacuum Bag Processes by Magnet Assisted Composite Manufacturing (MACM)," Compos. Part A Appl. Sci. Manuf., 98, pp. 227-237.

Amirkhosravi, M., Pishvar, M., and Cengiz Altan, M., 2018, "Fabricating High-Quality VARTM Laminates by Magnetic Consolidation: Experimentsand Process Model," Compos. Part A Appl. Sci. Manuf., 114, pp. 398-406.

Arbter, R., Beraud, J. M., Binetruy, C., Bizet, L., Bréard, J., Comas-Cardona, S., Demaria, C., Endruweit, A., Ermanni, P., Gommer, F., Hasanovic, S., Henrat, P., Klunker, F., Laine, B., Lavanchy, S., Lomov, S. V., Long, A., Michaud, V., Morren, G., Ruiz, E., Sol, H., Trochu, F., Verleye, B., Wietgrefe, M., Wu, W., and Ziegmann, G., 2011, "Experimental Determination of the Permeability of Textiles: A Benchmark Exercise," Compos. Part A Appl. Sci. Manuf., 42(9), pp. 1157-1168.

Bodaghi, M., Cristóvão, C., Gomes, R., and Correia, N. C., 2016, "Experimental Characterization of Voids in High Fibre Volume Fraction Composites Processed by High Injection Pressure RTM," Compos. Part A Appl. Sci. Manuf., 82, pp. 88-99.

Bowles, K. J., and Frimpong, S., 1992, "Void Effects on the Interlaminar Shear Strength of Unidirectional Graphite-Fiber-Reinforced Composites," J. Compos. Mater., 26(10), pp. 1487-1509.

Caglar, B., Yenilmez, B., and Sozer, E. M., 2015, "Modeling of Post-Filling Stage in Vacuum Infusion Using Compaction Characterization," J. Compos. Mater., 49(16), pp. 1947-1960.

Carraro, P. A., Maragoni, L., and Quaresimin, M., 2015, "Influence of Manufacturing Induced Defects on Damage Initiation and Propagation in Carbon/Epoxy NCF Laminates," Adv. Manuf. Polym. Compos. Sci., 1(1), pp. 44-53.

Causse, P., Ruiz, E., and Trochu, F., 2011, "Experimental Study of Flexible Injection to Manufacture Parts of Strong Curvature," Polym. Compos., 32(6), pp. 882-895.

Centea, T., and Hubert, P., 2013, "Out-of-Autoclave Prepreg Consolidation under Deficient Pressure Conditions," J. Compos. Mater., 48(16), pp. 2033-2045.

Chang, C.-Y., 2012, "Experimental Analysis of Mold Filling in Vacuum Assisted Compression Resin Transfer Molding," J. Reinf. Plast. Compos., 31(23), pp. 1630-1637.

Chen, D., Arakawa, K., and Uchino, M., 2016, "Effects of the Addition of a Cover Mold on Resin Flow and the Quality of the Finished Product in Vacuum-Assisted Resin Transfer Molding," Polym. Compos., 37, pp. 1435-1442.

Chen, D., Arakawa, K., and Xu, C., 2015, "Reduction of Void Content of Vacuum-Assisted Resin Transfer Molded Composites by Infusion Pressure Control," Polym. Compos., 36(9), pp. 1629-1637.

Correia, N. C., Robitaille, F., Long, A. C., Rudd, C. D., Simacek, P., and Advani, S. G., 2005, "Analysis of the Vacuum Infusion Moulding Process: I Analytical Formulation," Compos. Part A Appl. Sci. Manuf., 36(12), pp. 1645-1656.

Costa, M. L., de Almeida, S. F. M., and Rezende, M. C., 2005, "Critical Void Content for Polymer Composite Laminates," AIAA J., 43(6), pp. 1336-1341.

Costa, M. L., Rezende, M. C., and de Almeida, S. F. M., 2006, "Effect of Void Content on the Moisture Absorption in Polymeric Composites," Polym. Plast. Technol. Eng., 45(6), pp. 691-698.

Dong, C., 2016, "Effects of Process-Induced Voids on the Properties of Fibre Reinforced Composites," J. Mater. Sci. Technol., 32(7), pp. 597-604.

Garofalo, J., Walczyk, D., and Kuppers, J., 2017, "Rapid Consolidation and Curing of Vacuum-Infused Thermoset Composite Parts," J. Manuf. Sci. Eng., 139(2), pp. 021010-1-021010-10.

Govignon, Q., Bickerton, S., and Kelly, P. A., 2010, "Simulation of the Reinforcement Compaction and Resin Flow during the Complete Resin Infusion Process," Compos. Part A Appl. Sci. Manuf., 41(1), pp. 45-57.

Hamidi, Y. K., Aktas, L., and Altan, M. C., 2004, "Formation of Microscopic Voids in Resin Transfer Molded Composites," J. Eng. Mater. Technol., 126(4), p. 420.

Hamidi, Y. K., Aktas, L., and Altan, M. C., 2005, "Effect of Packing on Void Morphology in Resin Transfer Molded E-Glass/Epoxy Composites," Polym. Compos. , 26(5), pp. 614-627.

Hamidi, Y. K., Aktas, L., and Altan, M. C., 2005, "Three-Dimensional Features of Void Morphology in Resin Transfer Molded Composites," Compos. Sci. Technol., 65(7-8), pp. 1306-1320.

Hamidi, Y. K., and Altan, M. C., 2017, "Process Induced Defects in Liquid Molding Processes of Composites," Int. Polym. Process., 32(5), pp. 527-544.

Hernandez, S., Sket, F., Molina-Aldareguia, J. M., Gonzalez, C., and LLorca, J., 2011, "Effect of Curing Cycle on Void Distribution and Interlaminar Shear Strength in Polymer-Matrix Composites," Compos. Sci. Technol., 71(10), pp. 1331-1341.

Kardos, J., Duduković, M., and Dave, R., 1986, "Void Growth and Resin Transport during Processing of Thermosetting—Matrix Composites," Adv. Polym. Sci., 80, pp. 101-123.

Kaynak, C., and Kas, Y. O., 2006, "Effects of Injection Pressure in Resin Transfer Moulding (RTM) of Woven Carbon Fibre/Epoxy Composites," Polym. Polym. Compos., 14(1), pp. 55-64.

Kedari, V. R., Farah, B. I., and Hsiao, K.-T., 2011, "Effects of Vacuum Pressure, Inlet Pressure, and Mold Temperature on the Void Content, Volume Fraction of Polyester/e-Glass Fiber Composites Manufactured with VARTM Process," J. Compos. Mater., 45(26), pp. 2727-2742.

Kuentzer, N., Simacek, P., Advani, S. G., and Walsh, S., 2007, "Correlation of Void Distribution to VARTM Manufacturing Techniques," Compos. Part A Appl. Sci. Manuf., 38(3), pp. 802-813.

Lambert, J., Chambers, A. R., Sinclair, I., and Spearing, S. M., 2012, "3D Damage Characterisation and the Role of Voids in the Fatigue of Wind Turbine Blade Materials," Compos. Sci. Technol., 72(2), pp. 337-343.

Leclerc, J. S., and Ruiz, E., 2008, "Porosity Reduction Using Optimized Flow Velocity in Resin Transfer Molding," Compos. Part A Appl. Sci. Manuf., 39(12), pp. 1859-1868.

(56) References Cited

OTHER PUBLICATIONS

Maragoni, L., Carraro, P. A., and Quaresimin, M., 2016, "Effect of Voids on the Crack Formation in a [45/-45/0]s Laminate under Cyclic Axial Tension," Compos. Part A Appl. Sci. Manuf., 91, pp. 493-500.

Michaud, V., 2016, "A Review of Non-Saturated Resin Flow in Liquid Composite Moulding Processes," Transp. Porous Media, pp. 1-21.

Olivero, K. A., Barraza, H. J., O'Rear, E. A., and Altan, M. C., 2002, "Effect of Injection Rate and Post-Fill Cure Pressure on Properties of Resin Transfer Molded Disks," J. Compos. Mater., 36(16/2002), pp. 2011-2028.

Paciornik, S., and D'Almeida, J. R. M., 2008, "Measurement of Void Content and Distribution in Composite Materials through Digital Microscopy," J. Compos. Mater., 43(1), pp. 101-112.

Park, C. H., Lebel, A., Saouab, A., Bréard, J., and Lee, W. II, 2011, "Modeling and Simulation of Voids and Saturation in Liquid Composite Molding Processes," Compos. Part A Appl. Sci. Manuf., 42(6), pp. 658-668.

Pishvar, M., Amirkhosravi, M., and Altan, M. C., 2017, "Magnet Assisted Composite Manufacturing: A Novel Fabrication Technique for High-Quality Composite Laminates," Polym. Compos.

Pishvar, M., Amirkhosravi, M., and Altan, M. C., 2018, "Magnet Assisted Composite Manufacturing: A Flexible New Technique for Achieving High Consolidation Pressure in Vacuum Bag / Lay-up Processes," J. Vis. Exp., 135(e57254), pp. 1-11.

Ricciardi, M. R., Antonucci, V., Durante, M., Giordano, M., Nele, L., Starace, G., and Langella, A., 2013, "A New Cost-Saving Vacuum Infusion Process for Fiber-Reinforced Composites: Pulsed Infusion," J. Compos. Mater., 48(11), pp. 1365-1373.

Robinson, M. J., and Kosmatka, J. B., 2013, "Analysis of the Post-Filling Phase of the Vacuum-Assisted Resin Transfer Molding Process," J. Compos. Mater., 48(13), pp. 1547-1559.

Salvatori, D., Caglar, B., Teixidó, H., and Michaud, V., 2018, "Permeability and Capillary Effects in a Channel-Wise Non-Crimp Fabric," Compos. Part A Appl. Sci. Manuf., 108(February), pp. 41-52.

Sas, H. S., Simacek, P., and Advani, S. G., 2015, "A Methodology to Reduce Variability during Vacuum Infusion with Optimized Design of Distribution Media," Compos. Part A Appl. Sci. Manuf., 78, pp. 223-233.

Sayre, J. R., and Loos, A. C., 2003, "Resin Infusion of Triaxially Braided Preforms with Through-the-Thickness Reinforcement," Polym. Compos., 24(2), pp. 229-236.

Simacek, P., Eksik, O., Heider, D., Gillespie, J. W., and Advani, S., 2012, "Experimental Validation of Post-Filling Flow in Vacuum Assisted Resin Transfer Molding Processes," Compos. Part A Appl. Sci. Manuf., 43(3), pp. 370-380.

Stadtfeld, H., Eminger, M., Bickerton, S., and Advani, S. G., 2002, "An Experimental Method to Continuously Measure Permeability of Fiber Preforms as a Function of Fiber Volume Fraction," J. Reinf. Plast. Compos., 21(10), pp. 879-899.

Tackitt, K. D., and Walsh, S. M., 2005, "Experimental Study of Thickness Gradient Formation in the VARTM Process," Mater. Manuf. Process., 20(4), pp. 607-627.

Wisnom, M. R., Reynolds, T., and Gwilliam, N., 1996, "Reduction in Interiaminar Shear Strength by Discrete and Distributed Voids," Compos. Sci. Technol., 56(1), pp. 93-101.

Yalcinkaya, M. A., Caglar, B., and Sozer, E. M., 2017, "Effect of Permeability Characterization at Different Boundary and Flow Conditions on Vacuum Infusion Process Modeling," J. Reinf. Plast. Compos., 36(7), pp. 491-504.

Yalcinkaya, M. A., Guloglu, G. E., Pishvar, M., Amirkhosravi, M., Sozer, E. M., Altan, M. C., 2019, "Pressurized Infusion: A New and Improved Liquid Composite Molding Process," J. Manuf. Sci. & Eng., 141, 011007.

Yalcinkaya, M. A., Sarioglu, A., and Sozer, E. M., 2015, "A Novel Mold Design for One-Continuous Permeability Measurement of Fiber Preforms," J. Reinf. Plast. Compos., 34(11), pp. 915-930.

Yalcinkaya, M. A., Sozer, E. M., and Altan, M. C., 2017, "Fabrication of High Quality Composite Laminates by Pressurized and Heated-VARTM," Compos. Part A Appl. Sci. Manuf., 102, pp. 336-346.

Yalcinkaya, M., Sozer, E., and Altan, M., 2018, "Dynamic Pressure Control in VARTM: Rapid Fabrication of Laminates with High Fiber Volume Fraction and Improved Dimensional Uniformity," Polym. Compos., in press.

Yenilmez, B., Senan, M., and Sozer, E. M., 2009, "Variation of Part Thickness and Compaction Pressure in Vacuum Infusion Process," Compos. Sci. Technol., 69(11-12), pp. 1710-1719.

Zhu, H., Wu, B., Li, D., Zhang, D., and Chen, Y., 2011, "Influence of Voids on the Tensile Performance of Carbon/Epoxy Fabric Laminates," J. Mater. Sci. Technol., 27(1), pp. 69-73.

* cited by examiner

FIG. 5 Effect of chamber and inlet pressures on the mold filling time. The first and the second numbers of the FS designations correspond to $P_{chamber}$ and $P_{in}$ in kPa, respectively. The actual fill times are reported on top of each bar.

FIG. 6 (a) Thickness, (b) fiber volume fraction, and (c) void content of laminates fabricated by applying various $P_{chamber}$ and $P_{in}$. The error bars represent the 95% confidence interval of the experimental data.

FIG. 7 Micrographs taken from various laminates: (a) arrows point to wide resin-rich intertow regions in FS-0-0, (b) highly compacted microstructure due to high $P_{chamber}$ in FS-200-180, and (c) microstructure indicates slightly reduced fiber volume fraction due to expansion of the laminate in through-the-thickness direction at high inlet pressure, $P_{in}$, for FS-200-180-P

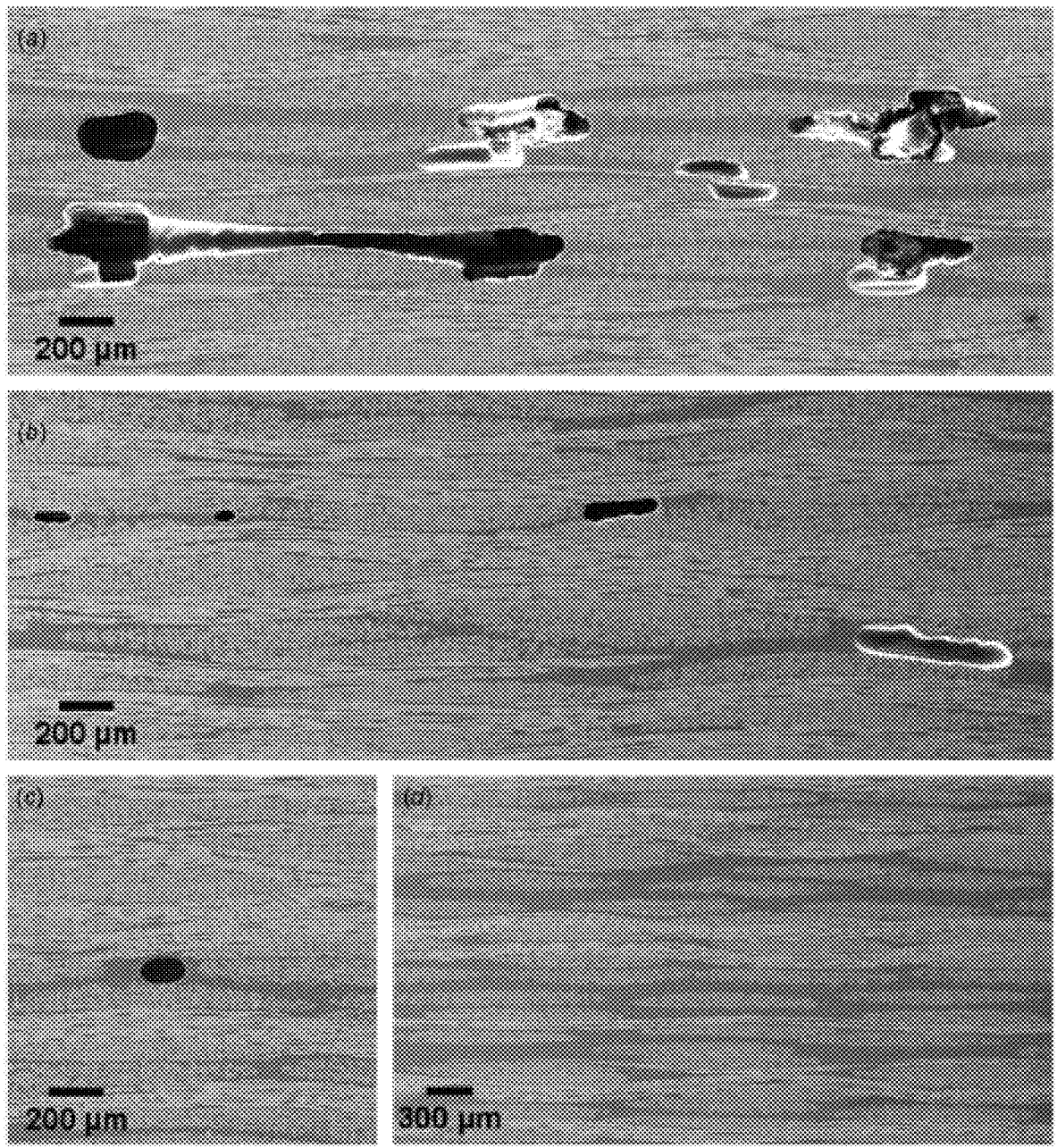

FIG. 8 Effect of process parameters on the void morphology: (a) numerous large voids due to low compaction and resin pressures in the conventional VARTM (i.e., FS-0-0), (b) compressed, slender voids extended under high $P_{chamber}$ in FS-100-0, (c) a void with smooth edges due to high $P_{in}$ in FS-200-180, and (d) void free cross section formed by applying a packing pressure during the post-filling in FS-200-180-P

FIG. 8

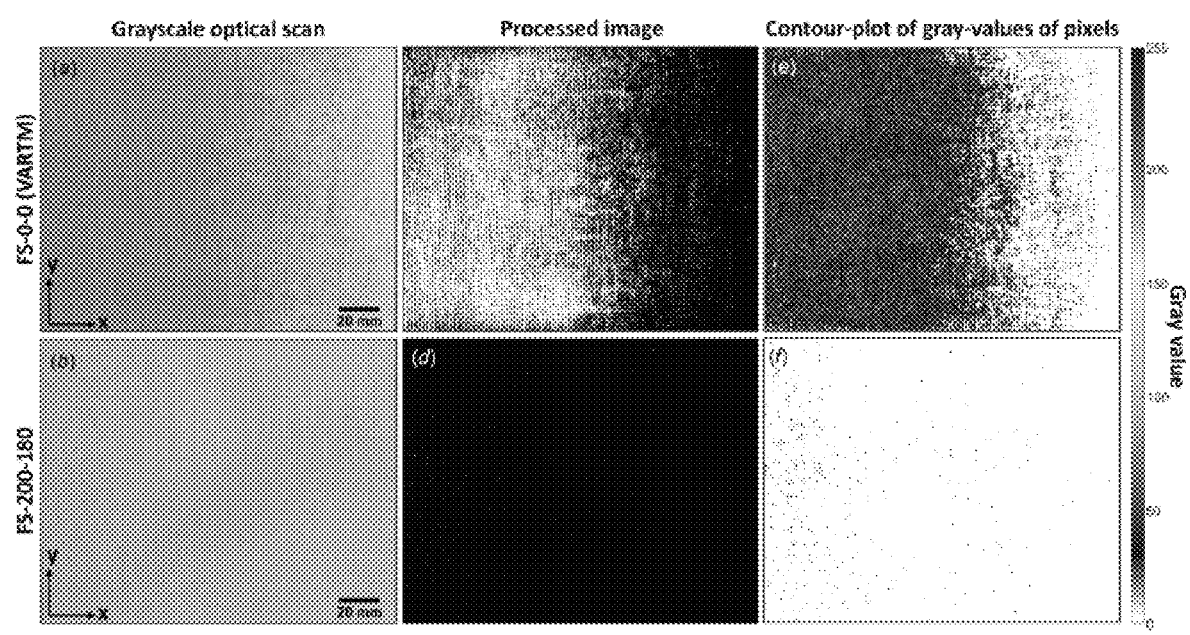

FIG. 9 ((a) and (b)) Planar optical scans of the laminates showing voids as darker regions; ((c) and (d)) images after processing the scans seen in (a) and (b); and ((e) and (f)) contour plots of gray values of pixels seen in the processed images. Red color in the color scale indicates less transparency, and thus, more voids through the thickness, which decreases as the color approaches to white in the color bar

FIG. 9

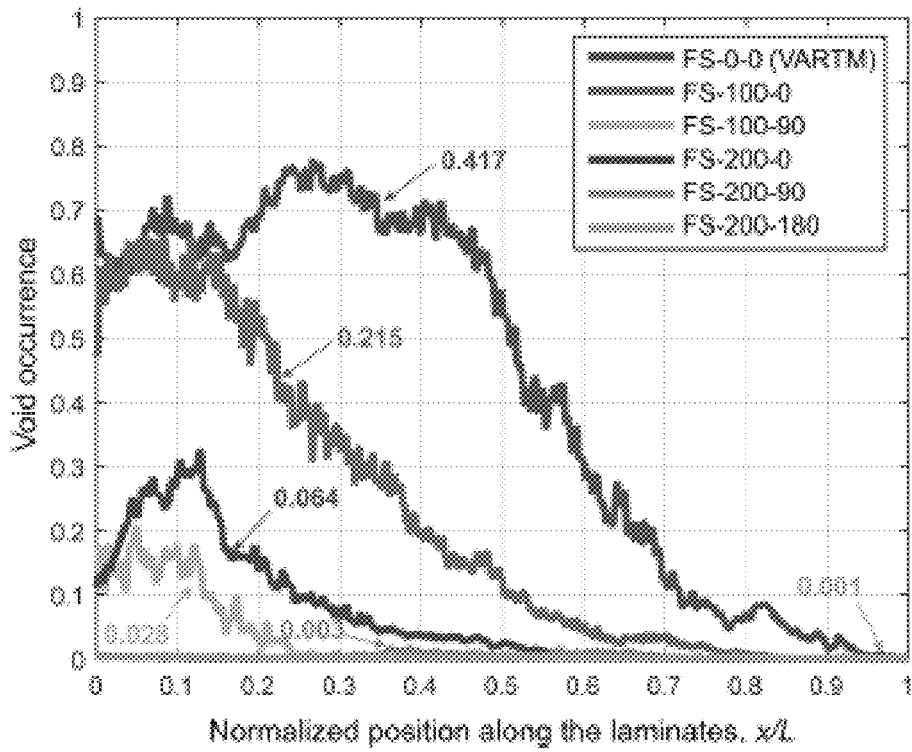

FIG. 10 Void occurrence along the resin flow direction of laminates fabricated by various combinations of $P_{chamber}$ and $P_{in}$. The numbers pointing the lines correspond to the void occurrence averaged along the laminate length. Void occurrence equals to the average gray value of the pixels along the width of the laminate normalized by the highest gray value of 255

FIG. 10

FIG. 11 Effect of $P_{in}$ on the number of voids and their size. Sections captured from laminates fabricated by (a) FS-200-0 and (b) FS-200-180.

FIG. 12 Effect of pressurized infusion molding on the SBS strength of laminates

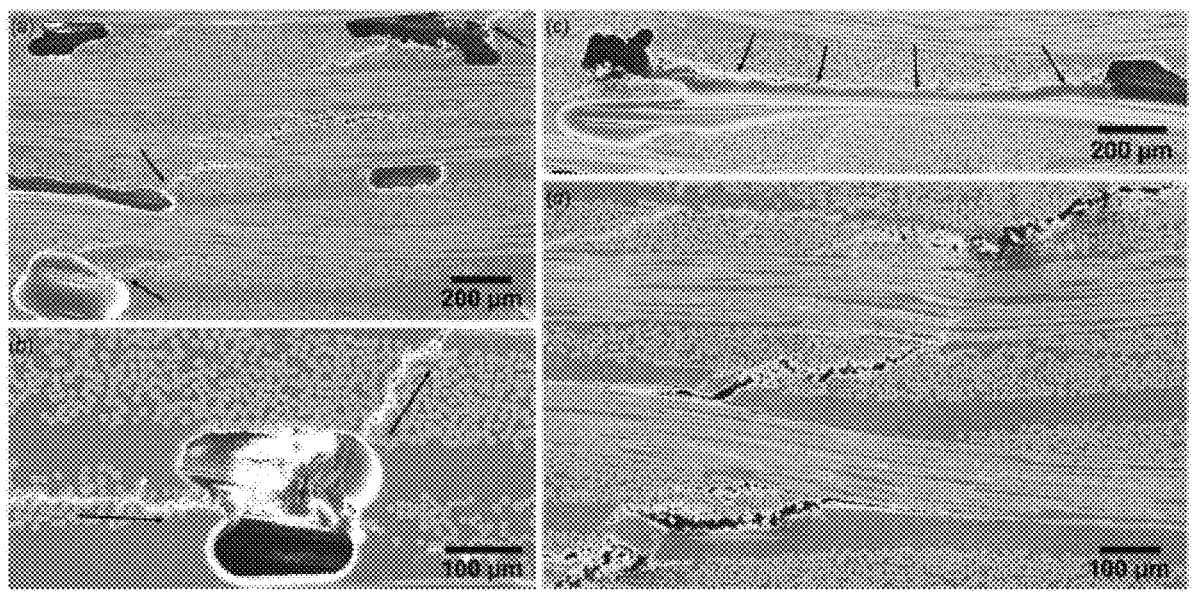

FIG. 13 Effect of voids on damage mechanisms. Micrographs were captured from fractured laminates fabricated by VARTM (FS-0-0). Arrows point to (a) cracks emanating from the edges of voids, (b) voids favoring the crack propagation through the thickness, and (c) delamination caused by large elongated voids. (d) An almost 45-deg crack propagation across a void free cross section is seen in a void free laminate fabricated by FS-200-180-P.

FIG. 13

SYSTEM AND METHOD FOR PRESSURIZED INFUSION LIQUID COMPOSITE MOLDING

RELATED APPLICATIONS

This application claims the benefit of U.S. Provisional Patent Application Ser. No. 62/870,389 filed Jul. 3, 2019 entitled, "System and Method for Pressurized Infusion Liquid Composite Molding," the disclosure of which is herein incorporated by reference.

BACKGROUND

Due to growing demand for lightweight materials with higher mechanical properties, fiber-reinforced composites have become more attractive for a wide variety of industrial applications. Fiber-reinforced composites are currently manufactured by various liquid composite molding (LCM) processes such as resin transfer molding (RTM) and vacuum-assisted resin transfer molding (VARTM), as well as autoclave molding. RTM and autoclave molding processes tend to produce high quality parts, but they require significant initial capital investment and higher maintenance and operational costs. RTM, for example, requires double-sided metal molds to be machined which exponentially increases tooling costs. Similarly, autoclave molding requires the use of expensive autoclave ovens.

By contrast, VARTM requires relatively simple and less expensive tooling and equipment. These lower capital and operating costs have increased the popularity of VARTM manufacturing processes. Although commercially popular, VARTM suffers from various drawbacks such as (i) long mold filling times leading to lower production rates, (ii) low fiber volume fraction leading to reduced mechanical properties, and (iii) high void content in fabricated laminates, causing potential premature failure and reduced durability. All three of these drawbacks of the VARTM process are mainly caused by the low resin and compaction pressures. Over the last two decades, several methods have been developed to reduce the cycle time in VARTM. Although these methods have successfully reduced the fabrication time by increasing the impregnation rate by increasing the velocity of the resin flow, their impact on part quality has not been shown. It is possible that the increased impregnation rate leads to increased air entrapment during this process, thus leading to higher levels of voids throughout the composite part. Moreover, most of these methods are only suitable for local flow enhancement and could not be applied on the whole mold, especially on molds with complex geometry.

There is, therefore, a need for an improved LCM process that enables the production of high quality parts without the need for expensive equipment and elevated operating costs. The present disclosure is directed to addressing these and other deficiencies in the prior art.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function.

FIG. 8 presents a series of micrographs showing the presence of voids and void morphology from materials produced during the experiments performed using the PI molding apparatus of FIG. 1.

FIG. 9 presents a series of planar optical scans of materials produced during the experiments performed using the PI molding apparatus of FIG. 1.

FIG. 10 presents a graph charting void occurrence against normalized position of various samples tested during an experiment performed using the PI molding apparatus of FIG. 1.

FIG. 13 presents a series of micrographs illustrating fractures or failures caused by short beam shear strength testing of various samples tested during an experiment performed using the PI molding apparatus of FIG. 1.

FIGS. 5-13 were previously published in "Yalcinkaya M A, Guloglu G E, Pishvar M, Amirkhosravi M, Sozer E M, Altan M C. Pressurized Infusion: A New and Improved Liquid Composite Molding Process. ASME. J. Manuf. Sci. Eng. 2018; 141(1):011007. doi:10.1115/1.4041569" Copyright (c) 2019 by ASME.

DETAILED DESCRIPTION

Figure 1:
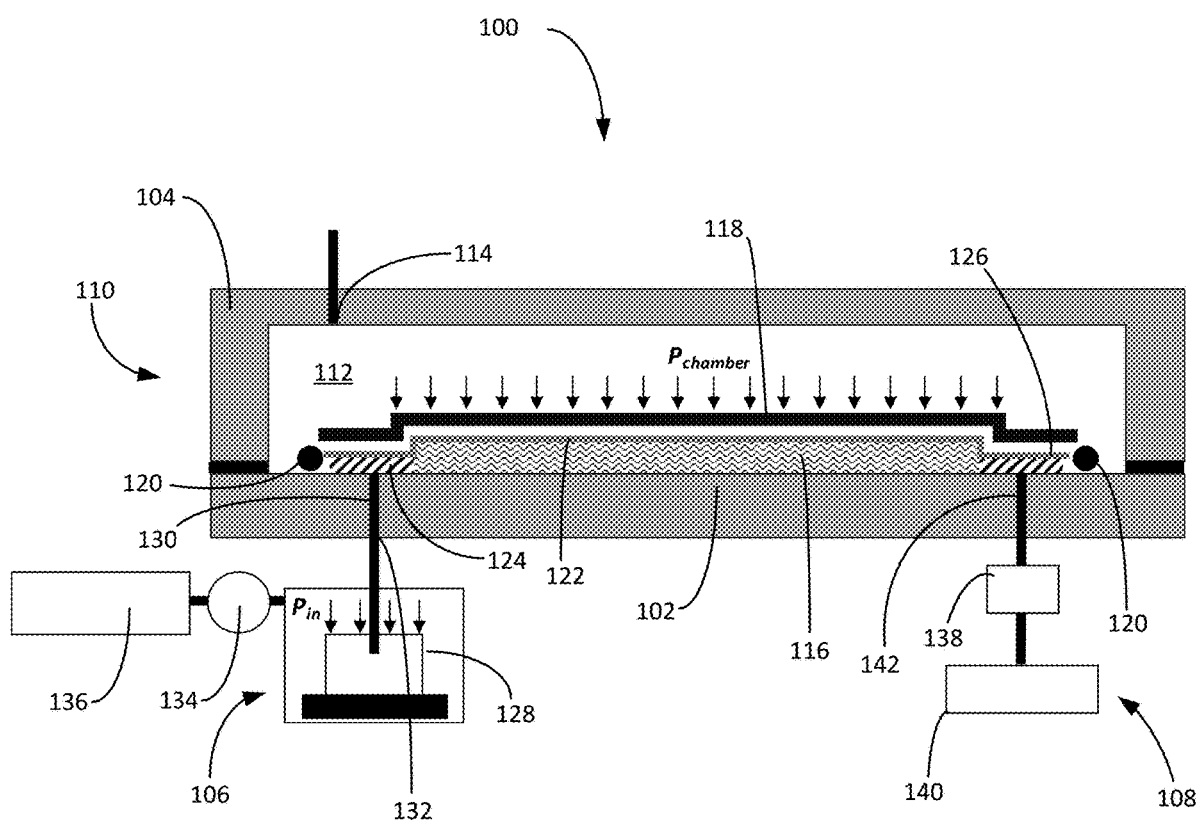
FIG. 1 depicts a pressurized infusion system constructed in accordance with exemplary embodiments.

In at least one non-limiting embodiment, the present disclosure is directed to a method for making a composite molded part with a liquid resin, comprising the steps of (a) providing a part mold that has an inlet gate and an exit gate, (b) placing a fabric preform over the part mold, (c) placing a membrane over the fabric preform, securing a pressure cap to the part mold, wherein the pressure cap and part mold together form a pressure chamber with a headspace between the membrane and the pressure cap, and (e) filling the fabric preform with liquid resin under the membrane while applying pressure within the headspace over the membrane.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where applicable, although state diagrams, flow diagrams or both may be used to describe embodiments, the present disclosure is not limited to those diagrams or to the corresponding descriptions. For example, flow need not move through each illustrated box or state, or in exactly the same order as illustrated and described. Methods of the present disclosure may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility). Still further, additional aspects of the various embodiments of the instant disclosure may be found in one or more appendices attached hereto and/or filed herewith, the disclosures of which are incorporated herein by reference as if fully set out at this point.

The present disclosure is directed, in non-limiting embodiments, to a system and method for liquid composite manufacturing (LCM) using pressurized infusion (PI). The embodiments disclosed herein substantially decrease manufacturing time and improve final part quality without the use of sophisticated tooling. Generally, the novel systems and methods disclosed herein overcome many of the shortcomings of prior art VARTM by using pressurized infusion of liquid resin into a one-sided mold that is covered by an elastic vacuum bag to reduce the mold filling time and reduce the void content in final product. To prevent the vacuum bag from inflating during the molding process, an external pressure is applied to the outside of the vacuum bag. The pressurized infusion of the liquid resin refers to controlling and varying the resin and compaction pressures before, during, and after the mold is filled with the resin. Depending on the application and the size and shape of the composite part to be manufactured, the pressure of the resin can be varied to achieve the best performance from the composite part.

Pressurized Infusion Molding Apparatus

Beginning with FIG. 1, shown therein is a simplified cross-sectional depiction of a PI molding apparatus 100 constructed in accordance with an exemplary embodiment. The PI molding apparatus 100 includes a part mold 102, a pressure cap 104, a resin injection assembly 106, and a resin extraction assembly 108. The pressure cap 104 is secured to the mold 102 with clamps, bolts or other mechanical fasteners (not shown in FIG. 1) to form an enclosed pressure chamber 110. The pressure cap 104 may include a sight glass or window for visual observation of the operations (not shown in FIG. 1) within the pressure chamber 110. Gaskets can be used to create an airtight seal between the pressure cap 104 and the mold 102 to contain elevated pressures within the pressure chamber 110. The pressure chamber 110 provides an enclosure that is substantially hermetically sealed and that includes a headspace 112 above the part within the part mold 102. The pressure cap 104 includes a chamber pressure inlet 114 that regulates the flow of pressurized air into the headspace 112 of the pressure chamber 110 from an external source such as a regulated pressurized air tank or a regulated air compressor. The chamber pressure inlet 114 controls the compaction pressure inside the pressure chamber 110 ($P_{chamber}$).

The mold 102 and the pressure cap 104 can be manufactured from aluminum or other durable materials. The mold 102 optionally includes a heating element that can be used to obtain a predetermined and uniform temperature distribution on the surface of the mold 102. The heating element provides temperature control which can be used to adjust the cure rate within the mold 102. Although the pressure chamber 110 is depicted in FIG. 1 as the combination of the mold 102 and the pressure cap 104, it will be appreciated that in some applications a separate pressure chamber base rather than the mold 102 is used in combination with the pressure cap 104 to form the pressure chamber 110. In those embodiments, the mold 102 is positioned inside the pressure chamber 110 between the pressure chamber base and the cap 104.

A fabric preform 116 rests inside the pressure chamber 110 on the mold 102. A membrane 118 covers the fabric preform 116 such that the headspace 112 is above the membrane 118 within the pressure chamber 110. The membrane 118 can be manufactured from a material that exhibits suitable elasticity while remaining substantially impermeable to liquids and gases. The fabric preform 116 may include one or more layers of fibrous material. The fabric preform 116 may include fiber glass, carbon fiber, or other organic and inorganic reinforcement materials. Disposable seals 120 can be used to hermetically seal the membrane 118 to the mold 102. Release film 122 or peel-ply can be placed between the membrane 118 and the fabric preform 116 to facilitate the removal of the membrane 118 from the fabric preform 116 after the resin has cured. Distribution media 124 and release fabric 126 may be used to secure the fabric preform 116 in fluid communication with the resin injection assembly 106 and the resin extraction assembly 108.

The resin injection assembly 106 includes a pressurized resin tank 128 and a resin injector 130. The resin injector 130 extends into the pressure chamber 110 below the membrane 118 and includes an inlet gate 132 that can be opened and closed through a manual or automatic mechanism. The pressurized resin tank 128 provides pressurized liquid resin through the resin injector 130 and distribution media 124 to the fabric preform 116 at a resin inlet pressure (P). In exemplary embodiments, the pressure inside the pressurized resin tank 128 is controlled using a resin pressure regulator 134 and a compressed air source 136. The pressure inside the pressurized resin tank 128 is adjusted by automatically or manually increasing or decreasing the output from the resin pressure regulator 134. In some embodiments, the compressed air source 136 is an external air compressor or compressed air tank. In other embodiments, the pressurized resin tank 128 is placed in a separate pressure vessel to facilitate pressurized infusion of the resin at predetermined pressure levels.

The resin extraction assembly 108 includes a vacuum pump 140, a resin collection tank 138 and an exit gate 142. The vacuum pump 140 applies a vacuum that is communicated to the fabric preform 116 under the membrane 118 through the exit gate 142. The exit gate 142 can be opened and closed through a manual or automatic mechanism to permit the extraction of excess resin from the fabric preform 116. Resin drawn through the exit gate 142 by the vacuum pump 140 is captured in the resin collection tank 138 for disposal, recycling or reuse.

The PI molding apparatus 100 can be used in different modes of operation to rapidly produce high quality liquid composite molded parts. Each method of use generally begins with preparatory steps of assembling and arranging the fabric preform 116, release film 122, distribution media 124, release fabric 126, membrane 118, and disposable seals 120 around the mold 102. The preparatory steps differ from conventional VARTM processes because the inlet gate 132 and exit gate 142 are not directed through the membrane 118. Once the preparatory steps have been completed, the resin impregnation process can begin.

Methods of Use

Figure 2:
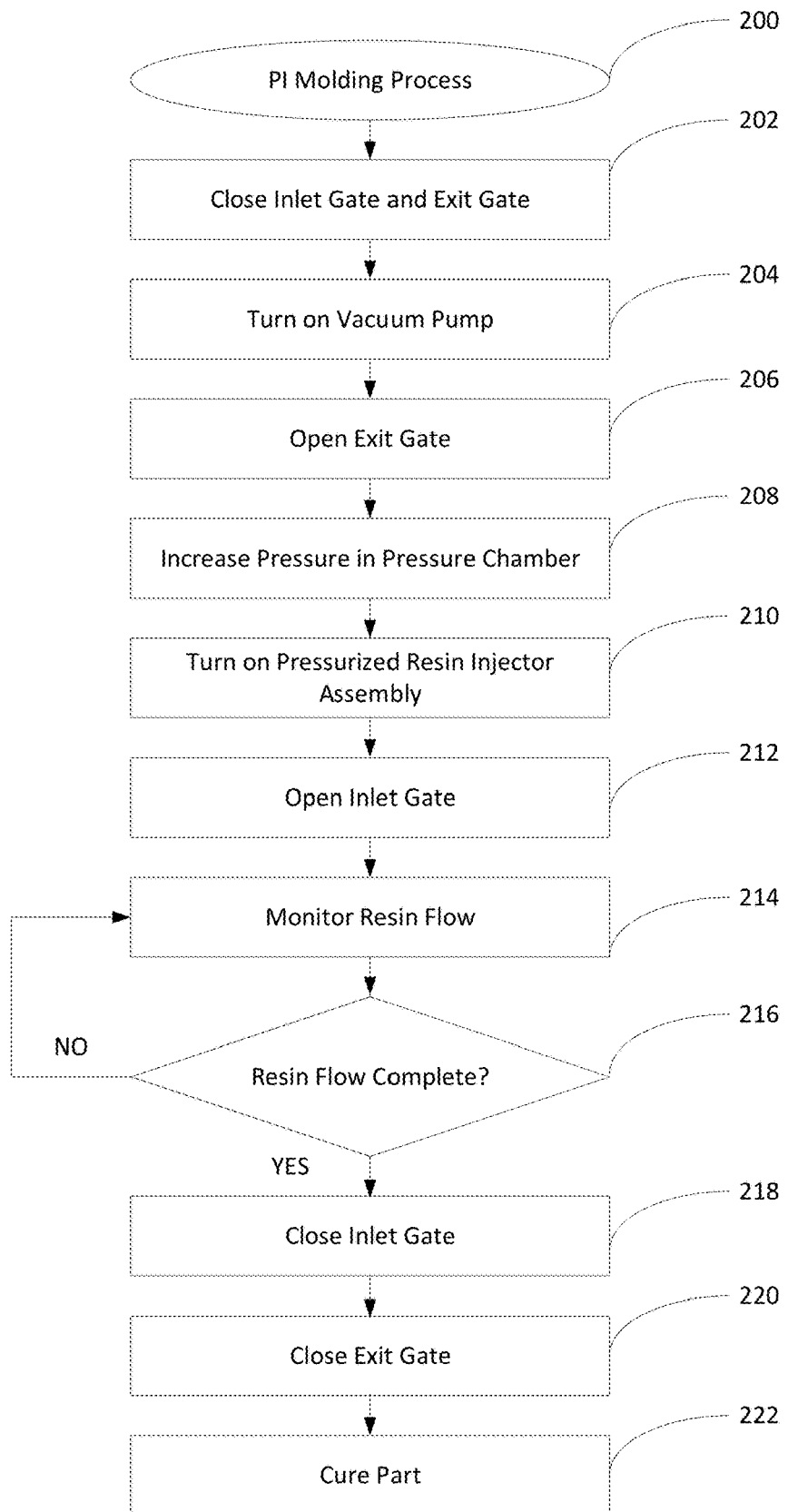
FIG. 2 is a flowchart for a first method of operating the PI molding apparatus of FIG. 1.
Figure 3:
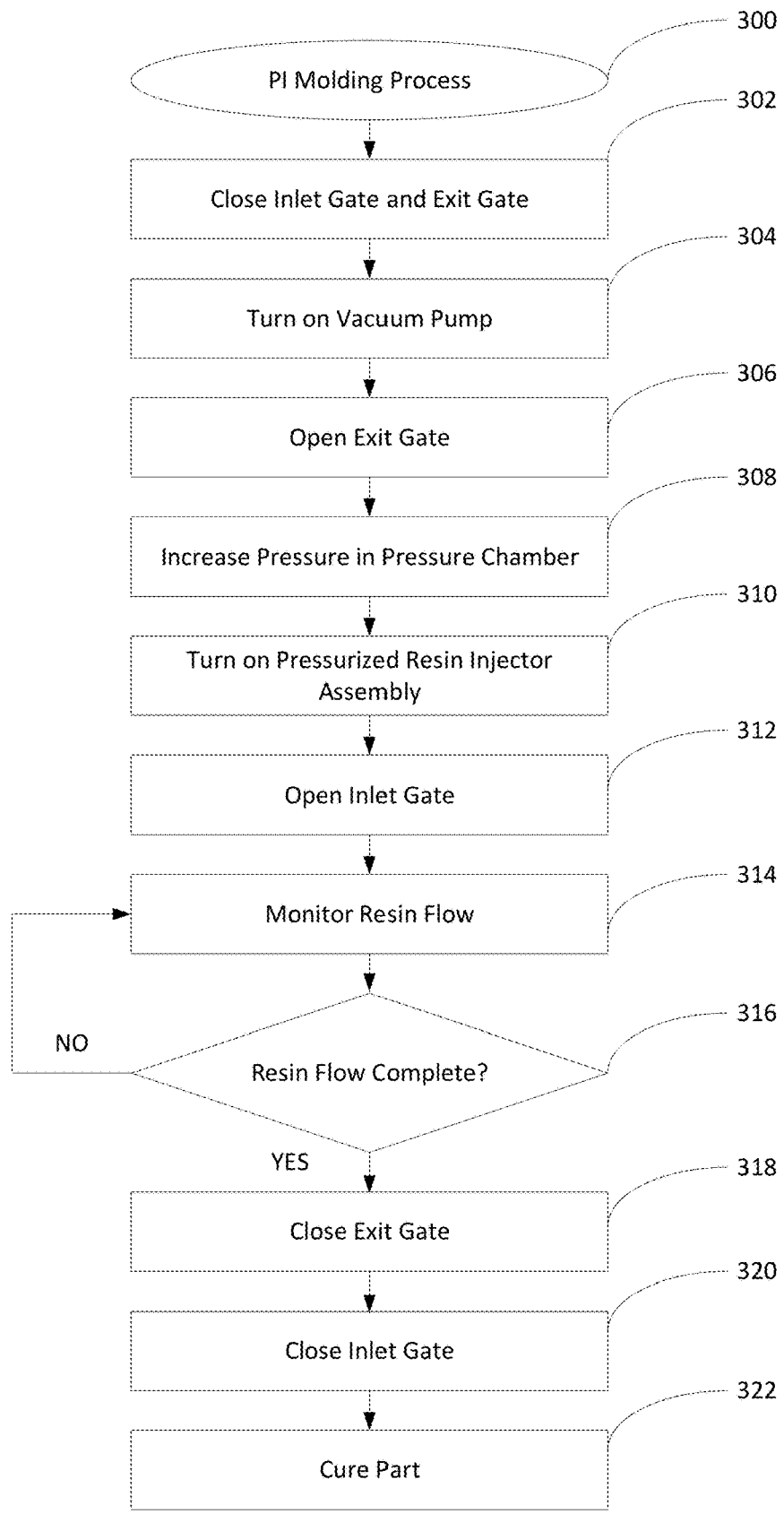
FIG. 3 is a flowchart for a second method of operating the PI molding apparatus of FIG.
Figure 4:
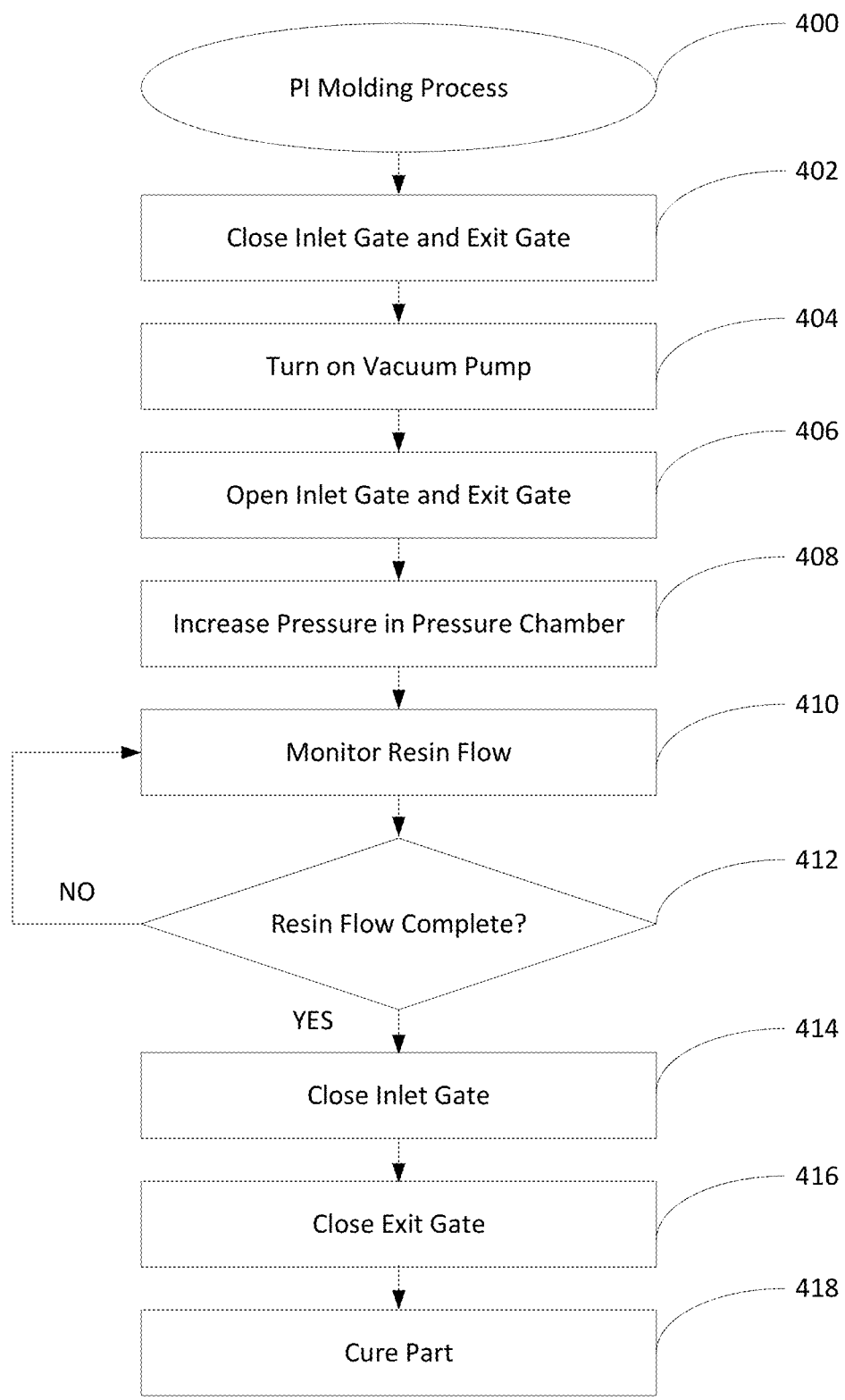
FIG. 4 is a flowchart for a third method of operating the PI molding apparatus of FIG. 1.

Turning to FIGS. 2-4, shown therein are various methods for operating the PI molding apparatus 100. The first and second modes of operating the PI molding apparatus 100 depicted in FIGS. 2 and 3 disclose pressurized infusion processes that are carried out in a pressurized environment within the pressure chamber 110. In contrast, the third mode of operating the PI molding apparatus 100 disclosed in FIG. 4 involves drawing the resin through the pressurized PI molding apparatus 100 under vacuum but without the assistance from a pressurized infusion.

Beginning with FIG. 2, a pressurized infusion method 200 begins at step 202 when the inlet gate 132 and exit gate 142 are closed. At step 204, the vacuum pump 140 is activated to produce a vacuum that is communicated to the underside of the membrane 118 when the exit gate 142 is opened at step 206. At step 208, the chamber pressure inlet 114 is opened and the pressure in the pressure chamber 110 is increased to a desired extent above atmospheric pressure. The increase in the pressure inside the pressure chamber 110 above the membrane 118 encourages compaction of the fabric preform 116 around the mold 102 and prevents the membrane 118 from inflating during the pressurized infusion process. At step 210, the resin injection assembly 106 is activated to pressurize the resin inside the pressurized resin tank 128. At step 212, the inlet gate 132 is opened to admit pressurized resin into the fabric preform 116 below the membrane 118. In exemplary embodiments, the pressure exerted by the chamber pressure inlet 114 above the membrane 118 is greater than the pressure of the resin below the membrane 118 to prevent the membrane 118 from inflating under the pressure of the resin. Although a higher resin pressure would result in faster impregnation of the fabric preform by the liquid resin, the increased resin pressure necessitates a higher chamber pressure.

Optionally, the flow of pressurized resin from the resin injection assembly 106 through the fabric preform 116 is monitored at step 216. In some embodiments, the flow of resin through the fabric preform 116 can be observed visually, by time, by weight, or by measuring the volume of resin transferred between the resin injection assembly 106 and resin extraction assembly 108. Once the flow of resin through the fabric preform 116 is complete, the method 200 passes to step 218 and the inlet gate 132 is closed. The vacuum pump 140 continues to draw resin through the fabric preform 116 until a sufficient quantity of pressurized resin has been drawn through the fabric preform 116, or until the exit gate 142 is closed at step 220. The resin-infused fabric preform 116 is then cured into a composite part and removed from the PI molding apparatus 100 at step 222. The part can be cured under atmospheric or elevated pressure. The composite part can be removed from the PI molding apparatus 100 removing the pressure cap 104 and then unpacking the composite part from the mold 102. It will be appreciated that the particular order of steps 202-212 and steps 218-222 may change based on the requirements of a particular liquid composite molding operation. For example, in some variations, the resin injection assembly 106 may be activated before the vacuum pump is activated.

Compared to traditional VARTM processes, the pressurized infusion method 200 permits the production of high-quality composite laminates with high fiber volume fraction and low void content while considerably reducing the cycle time by reducing the time required to fill the mold. By applying an external pressure on the fabric preform 116 and performing the infusion at an inlet pressure above atmospheric pressure, the pressurized infusion method 200 successfully addresses many of the most important shortcomings of conventional VARTM processes, including low compaction and resin pressures.

Turning to FIG. 3, shown therein is a packed pressurized infusion method 300. The steps of the packed pressurized infusion method 300 are the same as the pressurized infusion method 200 except that the exit gate 142 is closed at step 318 before the inlet gate 132 is closed at step 320. In this mode of operation, pressurized resin is forced into the fabric preform 116 after the exit gate 142 is closed, thereby "packing" the fabric preform 116 with additional resin while overbalanced pressure is applied to the top of the membrane 118. Applying packing after mold filling together with external chamber pressure significantly reduces the micro-voids in the fabricated laminates by increasing the hydrostatic resin pressure around the process-induced voids. As a result, the size and number of micro-voids decrease. The description of the remaining steps of the packed pressurized infusion method 300 is the same as the corresponding steps in the base pressurized infusion method 200.

Turning to FIG. 4, shown therein is a vacuum drawn infusion method 400. The steps of the vacuum drawn infusion 440 are the same as the pressurized infusion method 200 except that resin injection assembly 106 is not activated to pressurize the resin before it is drawn into the fabric preform 116. Instead, the resin is drawn into the fabric preform 116 by the resin extraction assembly at step 408 when the exit gate 142 and inlet gate 132 are opened (in no particular order). In this mode of operation, resin at atmospheric pressure is drawn through the fabric preform 116 while overbalanced pressure is applied to the top of the membrane 118. Under most circumstances, the vacuum drawn infusion method 400 requires additional time to transfer resin from the resin injection assembly 106 through the fabric preform 116 to the resin extraction assembly 108. Alternatively, pressure in the chamber 110 can be increased after complete impregnation of the fabric preform 116 to improve laminate quality without reducing the impregnation velocity. The description of the remaining steps of the vacuum drawn infusion method 400 is the same as the corresponding steps in the base pressurized infusion method 200.

Thus, the PI molding apparatus 100 differs significantly from prior art VARTM systems because: (i) the mold 102 is located inside the pressure chamber 110; (ii) the inlet gate 130 and exit gate 142 are located below the mold 102 rather than through the vacuum bag; and (iii) the resin injection assembly 106 is configured to support a pressurized infusion of liquid resin to the mold 102. The PI molding apparatus 100 enables high-pressure resin infusion through a vacuum-bagged fabric preform 116 because the mold 102 is externally pressurized by the pressure chamber 110. The external pressurization of the vacuum-bagged preform 116 avoids the swelling of the elastic membrane 118 when resin is injected at high pressures. The PI molding apparatus 100 permits the control of both resin and compaction pressures, which is not possible under conventional VARTM equipment.

As noted in the experimental results outlined below, the external pressurization in the PI molding methods (200, 300 and 400) also provides further consolidation of the fabric preform 116 and increases the fiber volume fraction in fabricated laminates. The high resin and compaction pressures also reduce process-induced voids/defects, which significantly improves the overall mechanical properties and service life of the manufactured parts. Additionally, the PI molding apparatus 100 and the modes of operation disclosed herein significantly reduce the time required to fill the mold 102 compared to conventional VARTM and similar liquid molding processes.

Figure 14:
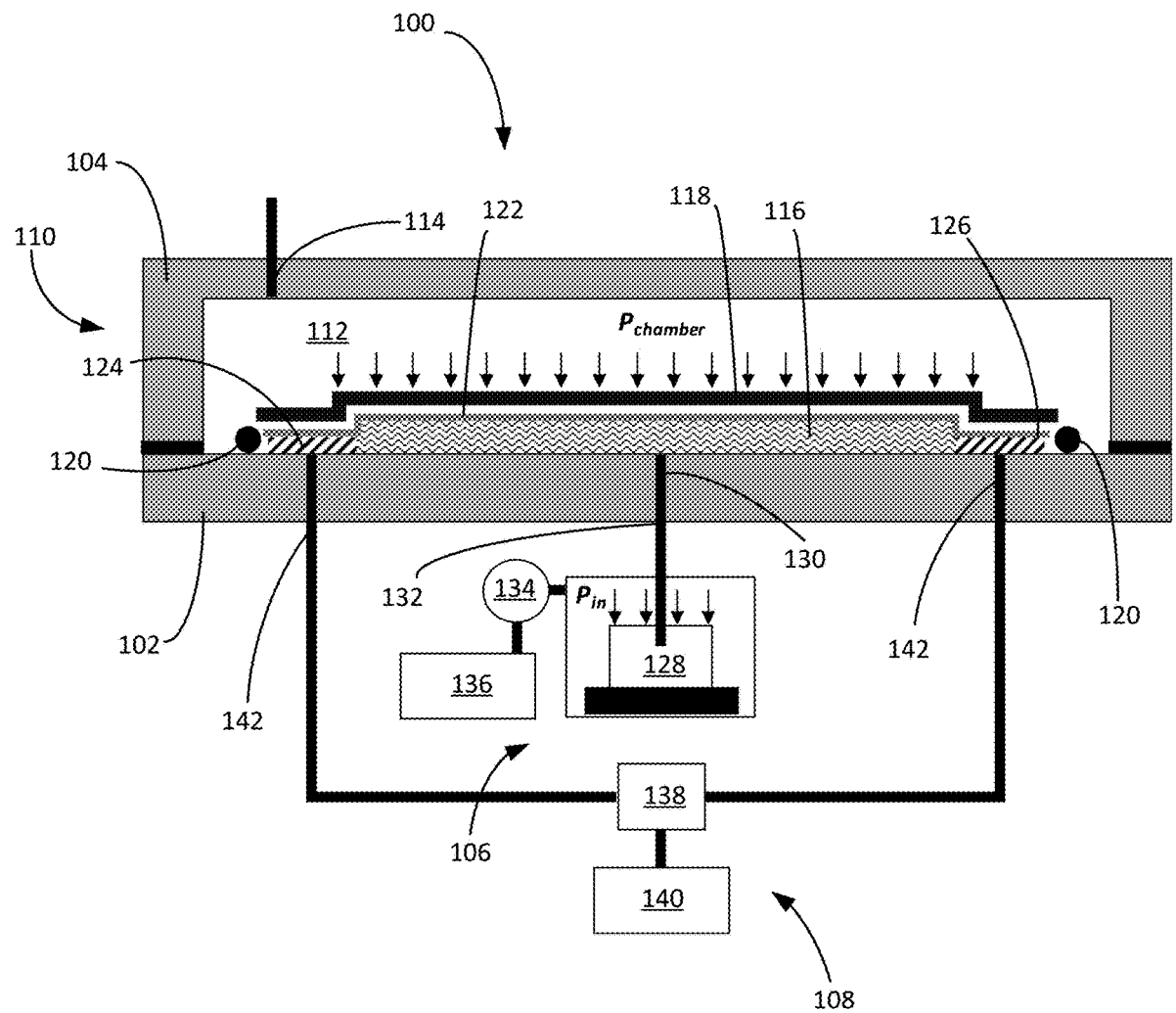
FIG. 14 depicts an embodiment of the pressurized infusion system illustrating an alternate injection/extraction configuration in which a plurality of exit gate draw resin injected from a single inlet gate.

Additionally, methods 200, 300 and 400 can also be facilitated when injection scenarios other than a one-dimensional line injection as shown in FIG. 1 are performed. FIG. 14 demonstrates a point injection scenario by facilitating PI molding. The inlet gate 132 can be single or multiple depending on the part geometry and dimensions. The use of dual exit gates 142 may facilitate the distribution of resin through the mold 102.

Experimentation and Results

To test the effectiveness of the PI molding apparatus 100, a series of experiments were run using commercially available materials. A common epoxy resin (PRO-SET INF-114) and hardener (INF-211) were mixed at a 100:27.4 weight ratio for 5 min at 350 rpm and degassed for 10 min before the infusion. The preform contained 18 layers of Hexcel HexForce 3733 plain-weave glass fabric cut and stacked such that the resin flow takes place in the roll direction of the fabric. The superficial density of the fabric, $q_{sup}$, is 197 g/m2. The planar dimensions of the preform are 203 mm in length (i.e., flow direction) and 152 mm in width.

The PI molding apparatus 100 depicted in FIG. 1 was used for testing. As explained above, the PI molding apparatus 100 differs from conventional VARTM systems by (i) the external pressure chamber mounted on top of the mold, (ii) placement of the inlet/exit gates below the mold rather than through the vacuum bag, and (iii) the pressure tank connected to the inlet gate. Moreover, no distribution medium is placed on top of the preform. The main components of the setup, tool plate and pressure chamber, are made of aluminum. The tool plate was slightly heated to 30° C. to obtain a uniform temperature distribution on the mold surface and achieve consistent resin viscosity unaffected by the changes in ambient temperature in all experiments. The resin reservoir was placed in a pressure tank to enable pressurized infusion of the resin at predetermined pressure levels. The pressure in both the chamber and the tank was regulated by pressure regulators to maintain constant compaction and inlet pressures, respectively. An electronic scale was installed in the pressure tank to monitor and record the resin mass during fabrication.

Seven different fabrication scenarios were tested. Each scenario was designated by a reference (FS-#1-#2) in which the first number (#1) of the fabrication scenario indicates the gage pressure in the chamber in kPa and the second number (#2) represents the gage pressure at the inlet reservoir in kPa. Two laminates for each scenario were fabricated to ensure the repeatability of the process. Each of these scenarios is outlined in Table 1 below:

TABLE 1

Fabrication scenarios with a different chamber and inlet pressure in pressurized infusion. $P_{chamber}$ and $P_{in}$ are listed as gage pressure values.

| Fabrication Scenario | Chamber Pressure, $P_{chamber}$ (kPA) | Inlet Pressure, $P_{in}$ (kPA) | Inlet Gate After Mold Filling | Exit Gate After Mold Filling | Postfilling Action |
|---|---|---|---|---|---|
| FS-0-0 | 0 | 0 | Closed | Open | Bleeding |
| FS-100-0 | 100 | 0 | Closed | Open | Bleeding |
| FS-100-90 | 100 | 90 | Closed | Open | Bleeding |
| FS-200-0 | 200 | 0 | Closed | Open | Bleeding |
| FS-200-90 | 200 | 90 | Closed | Open | Bleeding |
| FS-200-180 | 200 | 180 | Closed | Open | Bleeding |
| FS-200-180-P | 200 | 180 | Open | Closed | Packing |

The first case, FS-0-0, corresponds to the conventional VARTM in which neither $P_{chamber}$ nor $P_{in}$ was applied. This case was used as a reference to compare the other six fabrication scenarios of pressurized infusion molding. To investigate the individual effect of $P_{chamber}$ on the permeability of the preform, fiber volume fraction and void content, two chamber pressures of 100 and 200 kPa were applied during and after the mold filling which were designated as FS-100-0 and FS-200-0. In addition, $P_{in}$ of 90 and 180 kPa were utilized, which were selected to be slightly lower than $P_{chamber}$ of 100 and 200 kPa, respectively, to explore the synergistic effect of different $P_{chamber}$ and $P_{in}$ combinations on the mold filling time and laminate properties. $P_{chamber}$ was applied before the infusion was started and the pressure was continued during the mold filling to avoid expansion of the vacuum bag due to high resin pressure. $P_{chamber}$ was continued after the mold was completely filled to keep the preform compacted and achieve high fiber volume fraction.

In addition, Table 1 lists the state of the inlet and exit gates after complete mold filling in each fabrication scenario as postfilling actions. In the first 6 fabrication scenarios, the inlet gate was closed right after the mold is filled (i.e., when the resin arrived the exit gate), while the exit gate was continued to be vacuumed to bleed excess resin and increase fiber volume fraction. The last case introduced in Table 1, FS-200-180-P, differs from the others by changing the status of the inlet and exit gates after the mold filling. The letter "P" represents "packing" which is a postfilling action that has been commonly applied in resin transfer molding (RTM) to reduce the voids by building high resin pressure in the mold. However, due to the absence of a rigid upper mold and low inlet pressure, packing could not have been applied in the conventional VARTM processes. In these experiments, FS-200-180-P was performed to demonstrate that despite the elastic vacuum bag, PI molding allows the application of a sufficient packing pressure during postfilling.

Results and Analysis

Permeability of the preform, K, in various fabrication scenarios was analyzed to assess the combined effect of $P_{chamber}$ and $P_{in}$ on K. Generally, applying higher $P_{chamber}$ would decrease K, and thus, yield a longer fill time at a fixed $P_{in}$. However, in pressurized infusion molding, having a higher inlet pressure, Pin, could also have an effect on K due to possible slight expansion of the elastic vacuum bag, which could marginally increase the porosity of the preform. To investigate this effect, the permeability was calculated by using the flow front position versus time data acquired during the fabrication of laminates. In addition, the infused resin mass, $m_{resin}$, was measured to calculate the overall porosity of the preform when the mold filling is complete.

Table 2 reports the infused resin mass, porosity of the preform, and permeability, K, measured for different combinations of inlet and chamber pressures. Table 2 shows that increasing $P_{chamber}$ from 0 to 100 and 200 kPa significantly reduced porosity by compressing the preform and yielded a decrease in permeability by 37 and 66%, respectively. This reduction in permeability at high chamber pressure would increase the fill time unless higher levels of inlet pressure were utilized. As Table 2 shows, when inlet pressure was increased at a particular chamber pressure, more resin is infused. For example, FS-200-90 and FS-200-180 resulted in 9.8 and 17% more resin intake compared to FS-200-0, respectively. This increase in resin intake at high inlet pressure strongly indicates the expansion of the vacuum bag due to high resin pressure, which increased porosity of the preform and reduced the fiber volume fraction during mold filling. Therefore, higher inlet pressure yielded a discernable increase in permeability as seen in Table 2. This increase also indicates that the fill time would not be reduced only due to the increase in the resin pressure gradient but also due to the increase in preform permeability at a high inlet pressure.

TABLE 2

Effect of $P_{chamber}$ and $P_{in}$ on the infused resin mass, porosity, and permeability of the preform

| Fabrication Scenario | Experimental Infused Resin Mass, $m_{resin}$ (g) | Porosity, $\phi$ | Permeability, K ($10^{-11}$ m²) |
|---|---|---|---|
| FS-0-0 | 62 | 0.57 | 3.5 |
| FS-100-0 | 51 | 0.52 | 2.2 |
| FS-100-90 | 53 | 0.54 | 3.1 |
| FS-200-0 | 41 | 0.47 | 1.2 |
| FS-200-90 | 45 | 0.49 | 1.5 |
| FS-200-180 | 48 | 0.51 | 2.1 |

Figure 5:
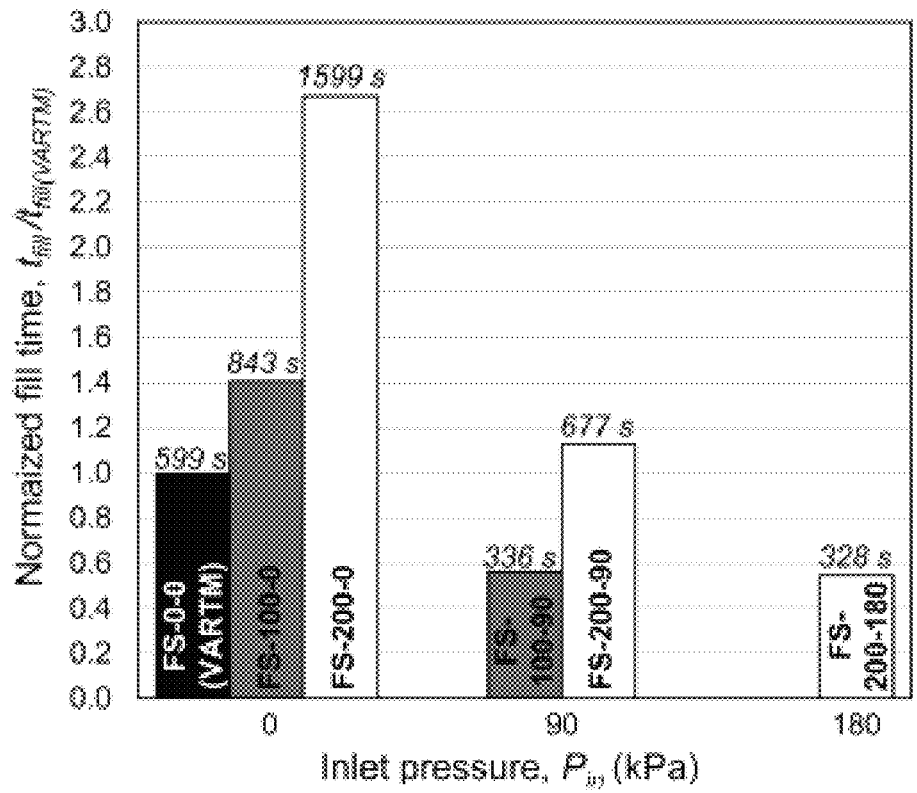
FIG. 5 presents a graph of fill time against resin inlet pressure from an experiment conducted on the methods of operating the PI molding apparatus of FIG. 1.

FIG. 5 depicts the average mold filling time, $t_{fill}$, in each fabrication scenario and the normalized $t_{fill}$ with respect to $t_{fill/VARTM}$=599 seconds in VARTM (FS-0-0). FIG. 5 clearly demonstrates that at $P_{in}$=0 kPa, applying $P_{chamber}$ of 100 and 200 kPa (i.e., FS-100-0 and FS-200-0) resulted in 41 and 167% longer $t_{fill}$ (i.e., 843 and 1599 s) compared to VARTM, respectively. The increase in $t_{fill}$ was caused by the significantly lower K due to increased preform compaction by higher $P_{chamber}$ as previously noted in Table 2. On the other hand, increasing $P_{in}$ from 0 to 90 kPa at $P_{chamber}$=100 kPa (i.e., FS-100-90) resulted in 60 and 44% lower $t_{fill}$ (i.e., 336 s) than FS-100-0 and FS-0-0, respectively. This significant reduction in $t_{fill}$ showed that the adverse effect of $P_{chamber}$ on K was entirely eliminated by increasing $P_{in}$. However, as FIG. 5 shows, at higher $P_{chamber}$ and moderate $P_{in}$ (i.e., FS-200-90), $t_{fill}$ was not reduced with respect to VARTM (FS-0-0), which implied that the decrease in K under high compaction pressure was more effective than the increase in $P_{in}$. Nonetheless, increasing $P_{in}$ to 180 kPa (FS-200-180) led to further reduction in $t_{fill}$ (i.e., 328 s) by 80 and 45% with respect to FS-200-0 and VARTM (FS-0-0).

The shorter mold filling times for FS-100-90 and FS-200-180 than FS-0-0 signified that substantial reduction in $t_{fill}$ could be achieved as the difference between $P_{chamber}$ and $P_{in}$ was decreased. The significant reduction in $t_{fill}$ was achieved by not only increasing the pressure difference (DP=$P_{exit}$-$P_1$) but also the preform permeability (see Table 2). In addition to the reduction of $t_{fill}$, further improvements in the laminate properties were expected to be achieved by reducing the voids and increasing fiber volume fraction due to high compaction and resin pressures. Moreover, at various levels of $P_{chamber}$ and $P_{in}$, the methods of the exemplary embodiments considerably reduced the resin consumption by about 15-34% compared to the conventional VARTM (see Table 2), which will further reduce the manufacturing costs, and yield more environmentally friendly production and composite laminates with enhanced properties.

Figure 6:
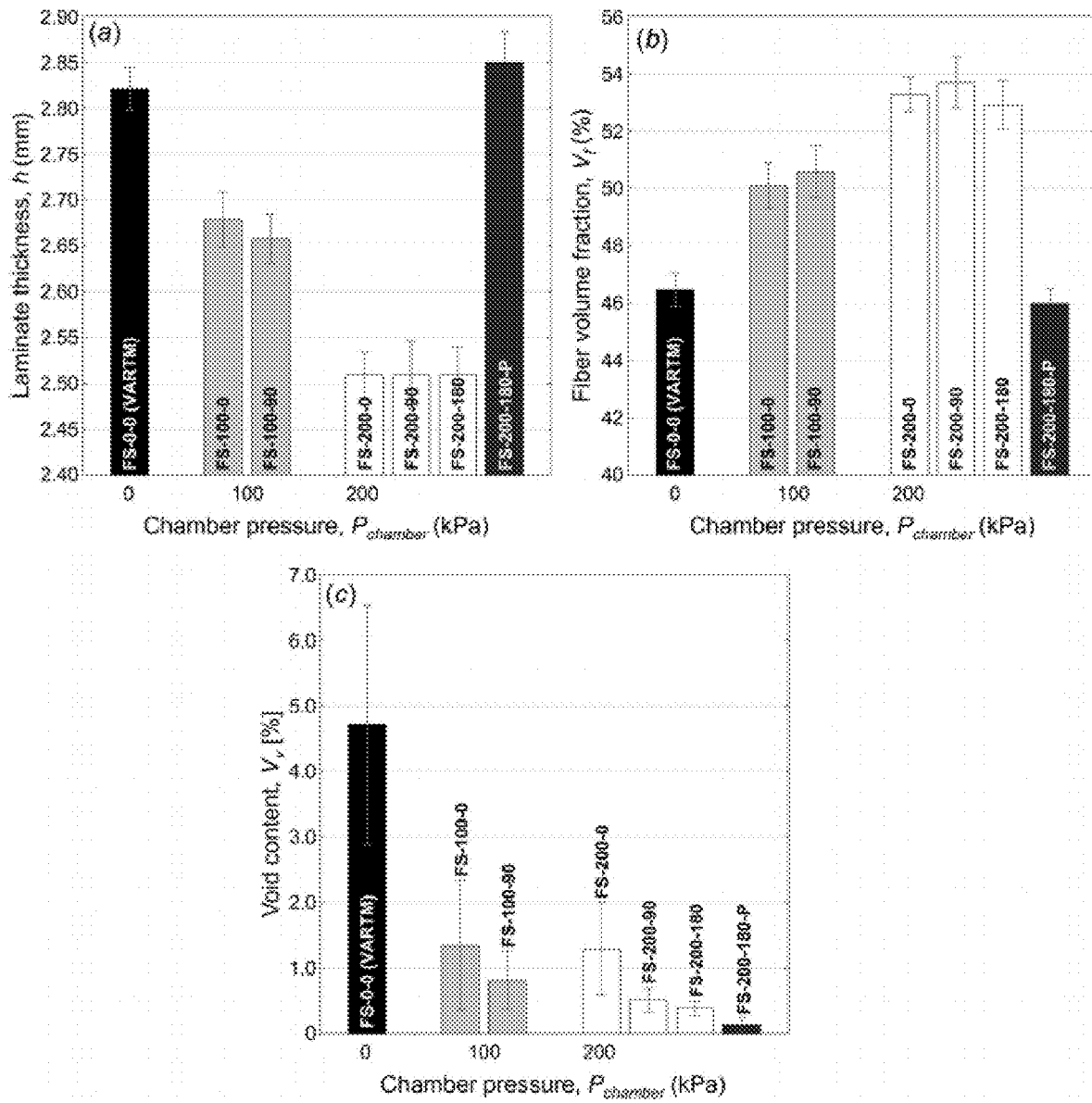
FIG. 6 presents graphs of laminate thickness, fiber volume fraction and void content against chamber pressure from an experiment conducted on the methods of operating the PI molding apparatus of FIG. 1.

FIG. 6 presents the average thickness, h, fiber volume fraction, Vf, and void content, Vv (a.k.a. void volume fraction), of laminates fabricated by various combinations of $P_{chamber}$ and $P_{in}$. The average thickness of laminates was determined by measuring the thickness at a grid of 35 equidistant locations (5 along the width×7 along the flow direction of the laminate). FIG. 5(a) shows that the average laminate thickness was decreased similarly at a particular level of $P_{chamber}$ in different fabrication scenarios facilitating different Pin. For example, FS-100-0 and FS-100-90 yielded 5.1 and 5.8% reduction in thickness, respectively, compared to the VARTM laminate (FS-0-0) that had a thickness of about 2.821. On the other hand, increasing the chamber pressure to 200 kPa in FS-200-0, FS-200-90, and FS-200-180 decreased the laminate thickness by about 11% compared to VARTM.

The lower thickness of the laminates fabricated by applying $P_{chamber}$ indicated further compaction of the preform due to high compaction pressure. Hence, a considerable increase in fiber volume fraction, Vf, was also expected. It is worth noting that in FS-200-180-P, reduction in thickness was not observed although 200 kPa of $P_{chamber}$ was applied as in FS-200-0, FS-200-90, and FS-200-180. The absence of thickness reduction in FS-200-180-P was mainly caused by the fact that high inlet resin pressure was continued to be applied by keeping the inlet gate open after the mold was filled. Keeping the inlet gate open resulted in additional resin intake after the mold is filled (about 27% more than FS-200-180). Since the exit gate was closed right after the complete mold filling, the additional resin intake during the postfilling resulted in small but discernible expansion of the vacuum bag and a higher laminate thickness. Despite the high resin pressure at the inlet, no significant thickness variation was observed in FS-200-180-P compared to the other fabrication scenarios, which assured that high resin pressure was sufficiently maintained and equilibrated throughout the laminate. Thus, for this scenario, significant improvement in laminate uniformity and mechanical properties, and reduction in void content were expected.

Fiber volume fraction, Vf, and void content, Vv, of laminates were determined according to ASTM D 3171 by conducting resin burn-off tests on 6 samples from each fabrication scenario. FIG. 6(b) shows that a relatively low Vf of 46.5% was achieved by conventional VARTM, whereas PI molding led to a substantial increase in Vf due to higher $P_{chamber}$. While $P_{chamber}$ of 100 kPa resulted in higher Vf of 50.1 and 50.6% in FS-100-0 and FS-100-90, respectively, increasing $P_{chamber}$ to 200 kPa led to an even higher Vf of 53.3%, 53.7%, and 52.9% in FS-200-0, FS-200-90, and FS-200-180, respectively. This significant increase in Vf was achieved by further compaction of the laminate under high chamber pressure. Additionally, FIG. 6(b) indicates no obvious effect of $P_{in}$ on Vf and signifies that despite the slight expansion of the vacuum bag during impregnation, the preform was compacted under high $P_{chamber}$ by removing the excess resin during postfilling. On the other hand, FS-200-180-P yielded lower Vf (46.0%) compared to FS-200-180 due to further resin intake and no resin outflow during postfilling.

The void content of laminates fabricated by various scenarios is presented in FIG. 6(c). As FIG. 6(c) shows, VARTM (FS-0-0) yielded high Vv of 4.7% as well as a relatively high variation of 61.8% (i.e., 95% confidence interval). Individual samples taken near the inlet of FS-0-0 contained Vv up to about 7%, which gradually decreased down to about 1.8% as the sample location approached the exit gate. The void content was considerably reduced from 4.7 to 1.4 and 1.3% when $P_{chamber}$ of 100 and 200 kPa were applied, respectively, in FS-100-0 and FS-200-0. It can be postulated that this significant reduction in Vv was achieved by (i) compression of voids under high compaction pressure, which reduced their size, and thus, the final Vv in the laminates and (ii) slower impregnation of the dual-scale porosity in the preform which led to the formation of fewer voids. However, applying only $P_{chamber}$ could not reduce Vv below 1.3% due to the low resin pressure in FS-100-0 and FS-200-0.

Aside from the significant reduction in Vv by high $P_{chamber}$, increasing $P_{in}$ yielded further decrease in Vv to below 1%. The variation in Vv throughout the laminate was also notably decreased as the error bars in FIG. 6(c) indicate. Vv decreased from 1.4% to 0.8% when $P_{in}$=90 kPa was applied at $P_{chamber}$=100 kPa (see FIG. 5(c)). Similarly, Vv was reduced from 1.3% to 0.5% and 0.4% when $P_{in}$=90 and 180 kPa were utilized at $P_{chamber}$=200 kPa, respectively. Furthermore, an almost void-free laminate was fabricated (Vv about 0.1%) when the high $P_{in}$ was kept at the inlet during cure by keeping the inlet open after the mold filling (i.e., FS-200-180-P). No significant variation in Vv along the fill direction was observed in laminates fabricated by applying higher levels of $P_{in}$. These results highlighted the positive effect of applying a high inlet pressure on the void reduction, and thus, overall laminate quality. Even though resin burn-off tests demonstrated a marked trend of Vf and Vv for the laminates fabricated at various levels of $P_{chamber}$ and $P_{in}$, the laminate microstructure was also analyzed to fully understand the effect of process parameters on the location, size, and morphology of voids as well as their reduction by PI molding.

Figure 7:
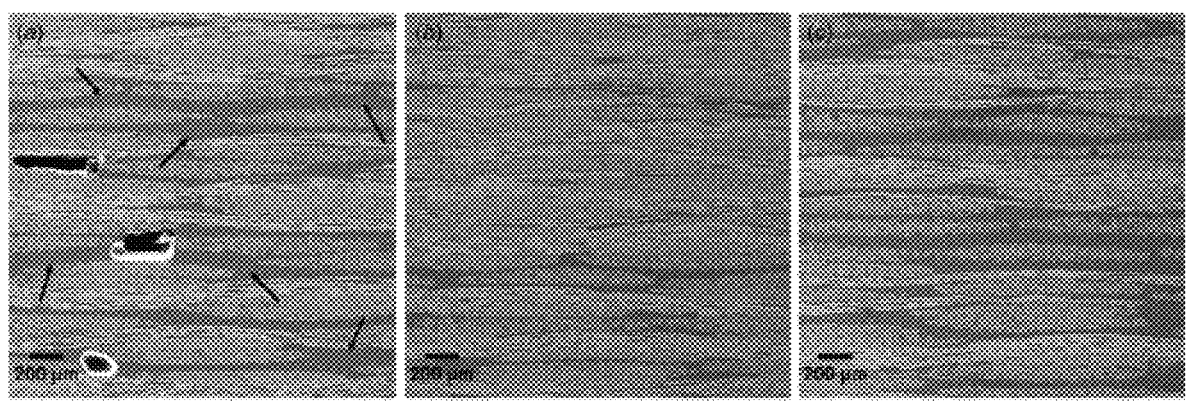
FIG. 7 presents a series of micrographs of laminates obtained from an experiment conducted on the methods of operating the PI molding apparatus of FIG. 1.

Turning to FIG. 7, shown therein are representative micrographs captured from FS-0-0, FS-200-180, and FS-200-180-P laminates. As FIG. 7(a) depicts, resin-rich intertow regions were frequently observed in between the fabric plies due to the low compaction pressure in VARTM (FS-0-0). Hence, FS-0-0 resulted in a relatively low Vf as previously reported in FIG. 6(b). On the contrary, a consolidated microstructure with smaller intertow gaps was recognized at Pchamber=200 kPa in FS-200-180 (see FIG. 7(b)), and thus, a high Vf up to about 54% was achieved. The narrow intertow gaps in FIG. 7(b) also confirmed the removal of excess resin caused by the slight expansion of the vacuum bag during mold filling at higher $P_{in}$. Conversely, FIG. 7(c) illustrates the reduction of Vf in FS-200-180-P due to the slightly enlarged intertow gaps compared to FS-200-180. The pressurization of the inlet gate after the mold filling forced excess resin in between the more permeable zones (i.e., the intertow gaps) which separated the fabric plies in through-the-thickness direction as seen in FIG. 6(c). Therefore, resin-rich zones were formed which in turn caused higher laminate thickness and lower fiber volume fraction. Yet, a significant reduction in number of voids and their size were expected in FS-200-180-P due to high resin pressure around the voids.

FIG. 8(a) illustrates voids in a laminate fabricated by VARTM (FS-0-0). The voids were mostly localized in between the fiber tows and confirmed the high void content obtained for FS-0-0. In addition, larger voids were observed in FS-0-0 which occurred due to low $P_{chamber}$ and $P_{in}$. Such large number of voids with irregular morphology was undesirable defects which could significantly deteriorate the mechanical properties and make the laminate prone to crack initialization and susceptible to excessive moisture absorption.

FIG. 8(b) depicts a representative micrograph of a laminate fabricated by FS-100-0 which corroborates that the voids were compressed and became smaller with increasing $P_{chamber}$. Similar observations were also valid for FS-200-0, which confirmed that $P_{chamber}$ significantly decreased the void content as also seen in FIG. 5(c). However, the voids were compressed in through-the-thickness direction and became elongated along the flow direction only when $P_{chamber}$ was applied (i.e., FS-100-0 and FS-200-0). As the previous studies suggested, elongated voids with sharper edges cause high stress-concentration zones at the tip of the voids, which are more prone to crack initiation and propagation.

FIG. 8(c), a micrograph from FS-200-180, confirms the significant reduction in Vv when high $P_{in}$ was applied. The examination of the scanning electron microscopy (SEM) images showed a small number of voids with circular shapes present in FS-200-180 laminate. The micrograph in FIG. 8(c) indicates that voids with irregular shapes (see FIG. 8(a)) were mostly suppressed and compressed by the high resin pressure. Hence, they became more spherical and smoother due to high $P_{in}$, which would possibly improve the mechanical properties by reducing the stress-concentration zones in the microstructure. Furthermore, FIG. 8(d) depicts a perfectly wetted and void-free cross section from FS-200-180-P. It should be highlighted that no void was captured in any samples taken from FS-200-180-P, which agreed well with the lowest average Vv of 0.1% among all fabrication scenarios reported in FIG. 6(c).

Voids have been usually characterized by using optical or scanning electron microscopy methods in the literature. However, acquiring thorough information on the planar distribution of voids over the entire laminate has not been practical by using the conventional microscopy techniques due to the necessity of preparing and analyzing numerous samples. A recent study demonstrated that commercial flatbed scanners could be used to rapidly analyze the planar distribution of voids over the entire surface of semi-transparent composite laminates. Similarly, in this study, laminates were scanned on a flatbed scanner at 2400 dpi which yielded a pixel size of about 10.5 lm, thus allowing individual voids with moderate sizes to be clearly identified. The scanned images were inverted and postprocessed using the image processing software, IMAGEJ and gray values of pixels were analyzed to identify the planar distribution of voids.

FIG. 9 demonstrates example scans, processed images, and their contour plots of gray values for the fabrication scenarios FS-0-0 and FS-200-180. As FIGS. 9(a) and 9(b) show, voids appeared as darker regions in the unprocessed scan data due to refraction of the light through voids. After inversion of the images and postprocessing, the regions with voids were represented by brighter pixels as seen in FIG. 9(c). The corresponding gray values of individual pixels seen in FIGS. 9(c) and 9(d) were plotted using contour plots in FIGS. 9(e) and 9(f). These contour plots illustrate the spatial distribution of voids both in planar directions and through the thickness of laminates. As the color bar on the right side of FIG. 9 indicates, red regions show higher gray value (brighter pixels), and thus, indicate the presence of more voids through the thickness. On the other hand, the color in FIGS. 9(e) and 9(f) shifts toward white as the voids become less frequent through the thickness. FIGS. 9(a), 9(c), 9(e) and 9(b), 9(d), 9(f) show the clear contrast between VARTM (FS-0-0) and PI molding at high $P_{chamber}$ and $P_1$ (FS-200-180). While a large area of the laminate was covered with voids in VARTM (see FIG. 9(a)), voids were significantly reduced in FS-200-180, which agreed with the decrease in void content previously reported in FIG. 6(c). Furthermore, scans for each fabrication scenario were analyzed and com-pared to interpret the effect of $P_{chamber}$ and $P_{in}$ on the spatial distribution of voids.

FIG. 10 depicts the distribution of voids along the length of the laminates (i.e., flow direction along x-axis). The gray value of pixels along the width of the laminates (i.e., y-direction) was averaged and normalized by the highest possible gray value of 255. The normalized average gray values corresponded to the void occurrence and were plotted along the length of laminates fabricated at various $P_{chamber}$ and $P_{in}$. A void occurrence of 0 indicated a column of pixels in the y-direction that were all black and void-free (see FIG. 9(d)), whereas a void occurrence of 1 indicated only white pixels illustrating nothing but only voids. It should be noted that almost no visible void was recognized in the scans of laminates fabricated by FS-200-180-P, which agreed well with the SEM analyses of FS-200-180-P as shown in FIGS. 7(c) and 8(d). Therefore, the void occurrence analysis for FS-200-180-P was not included in FIG. 10 to establish a clear comparison among other fabrication scenarios that did not facilitate packing pressure during the postfilling.

As FIG. 10 shows, voids were mostly localized near the inlet and void occurrence decreased toward the exit in the laminates with relatively high void occurrence (also see FIGS. 9(a), 9(c), and 9(e)). More immobile voids might have been formed near the inlet due to higher resin velocity, which grew as the resin pressure decreased, while the excess resin was bled out during the postfilling stage. An obvious reduction in void occurrence was achieved in FS-100-0 and FS-200-0 compared to VARTM (FS-0-0) which agreed well with decreasing Vv and its variation reported in FIG. 6(c). The decrease in void occurrence was achieved as a result of (i) slower impregnation due to reduced permeability and (ii) compression of voids at high $P_{chamber}$. Although FS-100-0 and FS-200-0 resulted in considerably fewer voids than VARTM, the fill time was compromised and a uniform distribution of voids was not achieved.

FIG. 10 illustrates that the void occurrence was further reduced when infusion was performed at higher Pin in FS-100-90, FS-200-90, and FS-200-180 than FS-0-0, FS-100-0, and FS-200-0. As also seen in FIG. 9(b), voids were significantly suppressed and the lowest void occurrence was achieved at the highest $P_{chamber}$ and $P_{in}$ in FS-200-180 among the laminates that were fabricated without applying the packing pressure during the postfilling stage. This significant reduction in void occurrence provides additional evidence of the compression of voids due to high resin pressure, which yielded fewer and smaller voids.

Figure 11:
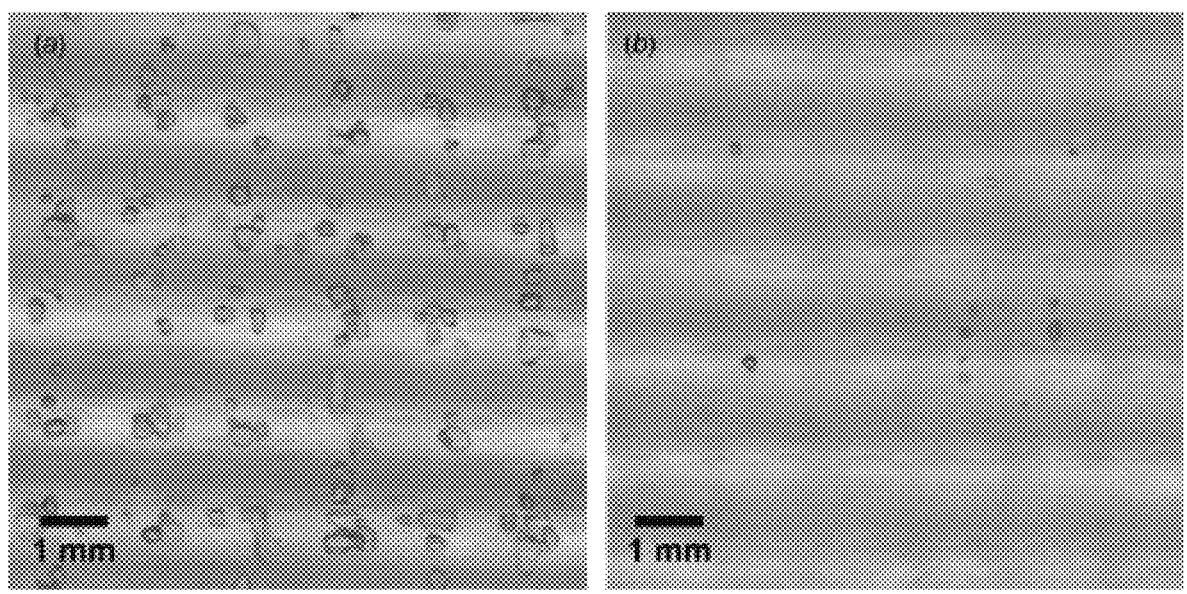
FIG. 11 presents a series of close-up sections from unprocessed images in FIG. 10 illustrating the number of voids and their size.

FIG. 11 demonstrates close-up sections from the unprocessed scan images of FS-200-0 and FS-200-180 to compare and contrast the effect of $P_{in}$ on the appearance of voids. The large voids in FS-200-0 seen in FIG. 11(a) were not only compressed but also dissolved and notably reduced in FS-200-180 as seen in FIG. 11(b). This obvious difference in void morphology confirmed that the high resin pressure helped decreasing both the size and the number of voids, which would significantly enhance the durability of the fabricated laminates by improving their mechanical properties.

Short beam shear (SBS) testing of composite materials has been a convenient method to assess the effect of voids on interlaminar properties. In this experiment, 8 adjacent samples along the fill direction were cut from each laminate and tested according to ASTM D 2344 to determine the SBS strength, $F^{sbs}$. Table 3 presents the average $F^{sbs}$ and its variation with 95% confidence interval for each fabrication scenario. Table 3 shows that no significant effect of Vf on $F^{sbs}$ was observed since $F^{sbs}$ is a matrix dominated property. On the other hand, the detrimental effect of Vv on $F^{sbs}$ was clearly observed in Table 3.

TABLE 3

Short beam shear strength with respect to fiber volume fraction and void content of laminates fabricated by applying various combinations of $P_{chamber}$ and $P_{in}$

| Fabrication Scenario | Short beam shear strength, $F_{sbs}$ (MPa) | Fiber volume fraction, $V_f$ (%) | Void content, $V_v$ (%) |
| --- | --- | --- | --- |
| FS-0-0 | 49 ± 2.1 | 46.5 ± 0.6 | 4.7 ± 1.8 |
| FS-100-0 | 53 ± 1.5 | 50.1 ± 0.8 | 1.4 ± 1.0 |
| FS-100-90 | 54 ± 0.7 | 50.6 ± 0.9 | 0.8 ± 0.5 |
| FS-200-0 | 53 ± 1.0 | 53.3 ± 0.6 | 1.3 ± 0.7 |
| FS-200-90 | 54 ± 0.9 | 53.7 ± 0.9 | 0.5 ± 0.2 |
| FS-200-180 | 54 ± 0.7 | 52.9 ± 0.8 | 0.4 ± 0.1 |
| FS-200-180-P | 56 ± 0.6 | 46.0 ± 0.5 | 0.1 ± 0.1 |

The lowest average $F^{sbs}$ of 49 MPa was measured in the laminates fabricated by VARTM, which indicated that high void content (i.e., 4.7%) significantly deteriorated $F^{sbs}$. As the void content decreased by applying high $P_{chamber}$ and $P_{in}$, $F^{sbs}$ was significantly improved. For example, applying only $P_{chamber}$ on VARTM (i.e., FS-100-0 and FS-200-0) increased $F^{sbs}$ from 49 to 53 MPa, representing about an 8% improvement compared to VARTM. When $P_{in}$ was elevated to higher levels (e.g. FS-200-180), $F^{sbs}$ was gradually increased up to 54 MPa (about 10% improvement) due to significant reduction in void content. Furthermore, applying packing pressure during the postfilling (i.e., FS-200-180-P) and reducing the void content to 0.1% led to the highest $F^{sbs}$ of 56 MPa, corresponding to a about 14% improvement compared to conventional VARTM.

Figure 12:
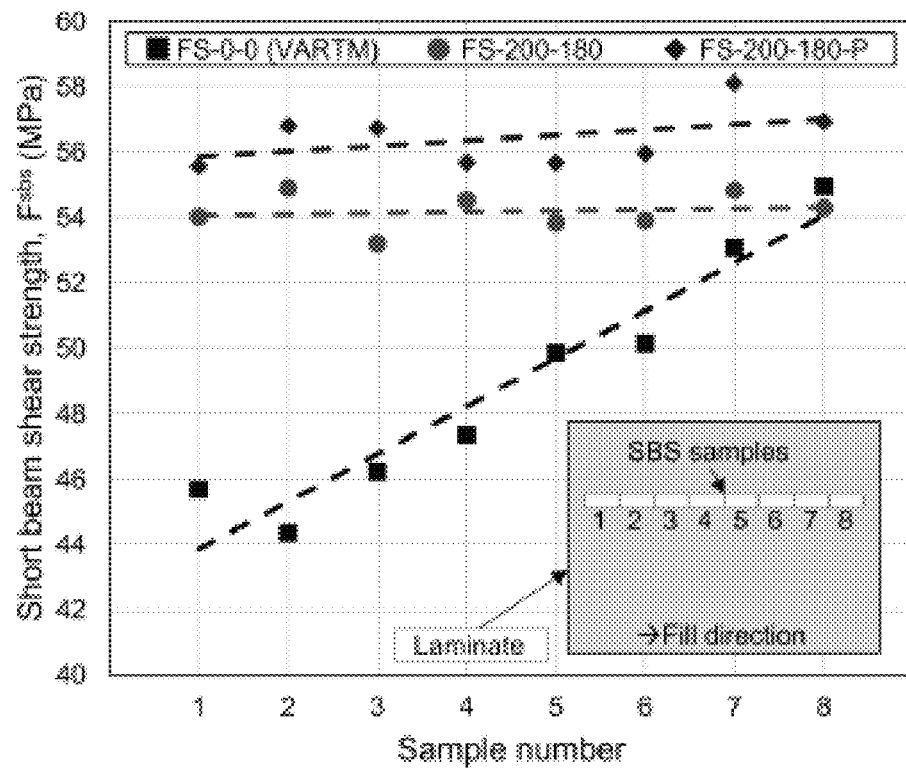
FIG. 12 presents a chart of the short beam shear strength of various samples tested during an experiment performed using the PI molding apparatus of FIG. 1.

The spatial variation in Fsbs was investigated by correlating the sample location and $F^{sbs}$, which established a stronger relation between the process-induced voids and the mechanical properties of the fabricated laminates. FIG. 12 demonstrates $F^{sbs}$ of adjacent samples taken along the flow direction where sample number 1 was near the inlet and number 8 was near the exit. For brevity, only $F^{sbs}$ of the laminates fabricated by FS-0-0, FS-200-180, and FS-200-180-P were included in FIG. 12 to clearly show the contrast between the fabrication scenarios that resulted in the highest and the lowest $F^{sbs}$. As the black squares in FIG. 12 depict, laminates fabricated by VARTM had a significant variation in $F^{sbs}$ along the flow direction. This high variation between about 44 and about 55 MPa in a laminate was caused by the high spatial variation of void occurrence (see FIG. 10). As the void occurrence increased toward the inlet in FS-0-0 (see FIG. 10), a clear gradient in $F^{sbs}$ along the fill direction was observed and $F^{sbs}$ drastically decreased down to about 44 MPa. On the other hand, a uniform and higher $F^{sbs}$ (i.e., rv54 to rv56 MPa) was achieved by PI molding as the blue and red data points demonstrate in FIG. 11. This considerable improvement was accomplished by the reduction and uniform distribution of voids in laminates fabricated by facilitating high $P_{chamber}$ and $P_{in}$.

To further investigate the effect of process-induced voids on the interlaminar properties, fractured samples were examined under SEM. FIG. 13 shows representative micrographs of fractured samples from the laminates fabricated by conventional VARTM (FS-0-0), which resulted in the highest void content of 4.7%. FIGS. 13(a) and 13(b) clearly depict the significant influence of voids on crack initiation and propagation. In FIG. 13(a), it is observed that many cracks emanated from the edges of the voids since voids with such irregular shapes induced high stress-concentration zones that were prone to crack initiation. In addition, FIG. 13(b) shows that voids harbored easy paths for cracks to propagate across the laminate thickness and through the voids, and cause premature failure under shear stresses. Moreover, high number of voids significantly reduced the net cross-sectional area (see FIGS. 8(a) and 13) under shear loading and yielded considerably lower shear strength down to about 44 MPa (see FIG. 12). FIG. 13(c) shows the detrimental effect of large and elongated voids seen near the inlet (i.e., SBS samples 1-4) in the laminates fabricated by the conventional VARTM (FS-0-0). These elongated voids in the intertow regions yielded long delaminated sections when a transverse crack propagated through the void, and thus, caused a lower shear strength (see FIG. 12). On the other hand, FIG. 13(d) shows a void-free cross section from a laminate fabricated by FS-200-180-P in which an almost 45-deg crack path was observed in the absence of voids. These findings substantiate the low and varying $F^{sbs}$ in VARTM caused by the high void content and the significant improvement in $F^{sbs}$ achieved by PI molding due to the reduction of voids.

These experiments demonstrate that the PI molding apparatus 100 and the use of pressurized infusion molding provides a new and improved liquid composite molding process that is useful for fabricating high-quality composite laminates with high fiber volume fraction and low void content while considerably reducing the cycle time. The exemplary embodiments successfully addressed some of the most important shortcomings of the conventional VARTM, which are low compaction and resin pressures, by applying an external pressure on the preform and performing the infusion at an inlet pressure above the atmospheric pressure.

Thus, the embodiments of the present disclosure are well adapted to carry out the objects and attain the ends and advantages mentioned above as well as those inherent therein. While the inventive device and system have been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts.

Paragraphs 54-81 were previously published in "Yalcinkaya M A, Guloglu G E, Pishvar M, Amirkhosravi M, Sozer E M, Altan M C. Pressurized Infusion: A New and Improved Liquid Composite Molding Process. ASME. J. Manuf. Sci. Eng. 2018; 141(1):011007. doi:10.1115/1.4041569" Copyright (c) 2019 by ASME.

What is claimed is:

1. A method for making a composite molded part with a liquid resin, the method comprising the steps of:
   providing a part mold that has an inlet gate connected to a resin injection assembly and an exit gate connected to a resin extraction assembly;
   placing a fabric preform over the part mold;
   placing a membrane over the fabric preform;
   securing a pressure cap to the part mold, wherein the pressure cap and part mold together form a pressure chamber with a headspace between the membrane and the pressure cap;
   activating a vacuum pump within the resin extraction assembly to produce a vacuum under the membrane; opening the exit gate while the inlet gate remains closed; applying a chamber pressure ($P_{chamber}$) in the headspace; opening the inlet gate to supply liquid resin to the fabric preform below the membrane while the exit gate remains open; filling the fabric preform with the liquid resin under the membrane at an inlet pressure ($P_{in}$) while applying the chamber pressure ($P_{chamber}$) within the headspace over the membrane, wherein the inlet pressure ($P_{in}$) is less than the chamber pressure ($P_{Chamber}$); and extracting the resin from the fabric preform through the exit gate with the resin extraction assembly.

2. The method of claim 1, wherein the step of securing the pressure cap to the part mold further comprises providing a chamber pressure inlet within the pressure cap that is in fluid communication with the headspace above the membrane.

3. The method of claim 2, wherein the step of filling the fabric preform with the liquid resin further comprises the step of increasing the chamber pressure above the membrane through the chamber pressure inlet.

4. The method of claim 1, wherein the step of filling the fabric preform with the liquid resin further comprises the step of pressurizing the resin before it is admitted into the fabric preform.

5. The method of claim 4, wherein the step of pressurizing the resin further comprises pressurizing a resin tank connected to the inlet gate, wherein the resin tank contains the liquid resin.

6. The method of claim 1, wherein the step of extracting the resin through the exit gate further comprises the steps of:
   closing the inlet gate;
   drawing excess liquid resin out of the fabric preform through the exit gate; and
   closing the exit gate.

7. The method of claim 1, wherein following the step of extracting the resin through the exit gate, the method includes the steps of: closing the exit gate; packing the fabric preform with additional resin by continuing to inject the resin into the fabric preform; and closing the inlet gate.

8. The method of claim 1, further comprising the step of monitoring the movement of the resin through the fabric preform.

9. The method of claim 8, wherein the step of monitoring the movement of the resin through the fabric preform further comprises visually monitoring the movement of the resin through the fabric preform.

10. The method of claim 1, wherein the method comprises the additional step of placing release fabric over the fabric preform before the step of placing the membrane over the fabric preform.

\* \* \* \* \*